US012146789B2

(12) United States Patent
Kostadinov et al.

(10) Patent No.: US 12,146,789 B2
(45) Date of Patent: Nov. 19, 2024

(54) SENSOR DEVICE AND METHOD FOR OPERATING A SENSOR DEVICE

(71) Applicant: Sony Semiconductor Solutions Corporation, Atsugi (JP)

(72) Inventors: Dimche Kostadinov, Stuttgart (DE); Ryoji Ikegaya, Stuttgart (DE); Christian Peter Brändli, Stuttgart (DE)

(73) Assignee: SONY SEMICONDUCTOR SOLUTIONS CORPORATION, Atsugi (JP)

( * ) Notice: Subject to any disclaimer, the term of this patent is extended or adjusted under 35 U.S.C. 154(b) by 0 days.

(21) Appl. No.: 18/502,962

(22) Filed: Nov. 6, 2023

(65) Prior Publication Data

US 2024/0328852 A1    Oct. 3, 2024

Related U.S. Application Data

(63) Continuation-in-part of application No. PCT/EP2023/072189, filed on Aug. 10, 2023.

(30) Foreign Application Priority Data

Mar. 27, 2023    (EP) .................... 23164426

(51) Int. Cl.
*G01J 1/44* (2006.01)
*G06N 3/045* (2023.01)
*H04N 25/47* (2023.01)

(52) U.S. Cl.
CPC ............... *G01J 1/44* (2013.01); *G06N 3/045* (2023.01); *H04N 25/47* (2023.01)

(58) Field of Classification Search
CPC ........... G01J 1/44; G06N 3/045; H04N 3/155; H04N 25/40; H04N 25/47
See application file for complete search history.

(56) References Cited

U.S. PATENT DOCUMENTS 11,526,209 B2 * 12/2022 Brändli ................. G06F 3/013
2021/0312189 A1 10/2021 Bisulco

FOREIGN PATENT DOCUMENTS

EP    3933550 A1    1/2022

OTHER PUBLICATIONS

Goodfellow et al., "Deep Learning" (2017, MIT).
(Continued)

*Primary Examiner* — Kevin K Pyo
(74) *Attorney, Agent, or Firm* — XSENSUS LLP

(57) ABSTRACT

A sensor device comprises a vision sensor comprising a pixel array having a plurality of pixels each being configured to receive light and perform photoelectric conversion to generate an electrical signal, based on which electrical signals a data stream is formed, an encoding unit that receives the data stream and generates a series of representations that represent states of the data stream, a trigger unit that is configured to receive a current representation from the encoding unit, to compare the current representation with a reference representation, and to generate trigger signal based on said comparison, and a processing unit that is configured to receive the trigger signals and to carry out predetermined processing based on representations for which the predetermined processing was indicated to be allowed by the respective trigger signal. Here, the processing unit is configured to use a first machine learning module to carry out the predetermined processing.

17 Claims, 23 Drawing Sheets

(56) References Cited

OTHER PUBLICATIONS

Kostadinov et al., Unsupervised Feature Learning for Event Data: Direct vs Inverse Problem Formulation, IAPR IEEE/Computer Society International Conference on Pattern Recognition (ICPR), Milan, 2021.
Messikommer et. al., "Event-based Asynchronous Sparse Convolutional Networks", European Conference on Computer Vision (ECCV), Glasgow, 2020.
Jacob M.J. Murre, "Learning and Categorization in Modular Neural Networks", Lawrence Erlbaum Assciates, 1992.
Chen et al., "A Simple Framework for Contrastive Learning of Visual Representations" Proceedings of the 37th International Conference on Machine Learning, Vienna, Austria, PMLR 119, Jul. 1, 2020.
Schaefer et al., "AEGNN: Asynchronous Event-based Graph Neural Networs", IEEE Conference on Computer Vision and Pattern Recognition (CVPR), New Orleans, 2022.
Dosovitskiy et al., An Image is Worth 16×16 Words: Transformers for Image Recognition at Scale, ICLR, 2021.
Robert M. French, "Catastrophic forgetting in connectionist networks", SdenceDirect, Apr. 1, 1999, pp. 128-135, vol. 3, Issue 4.
Zhihao Li et al, "Event Transformer", 2204.05172, Apr. 2022.
Gehrig et al., "Recurrent Vision Transformers for Object Detection with Event Cameras". Robotics and Perception Group, University of Zurich, arxiv22_detection_mgehrig, Dec. 11, 2022.

\* cited by examiner

Fig. 21
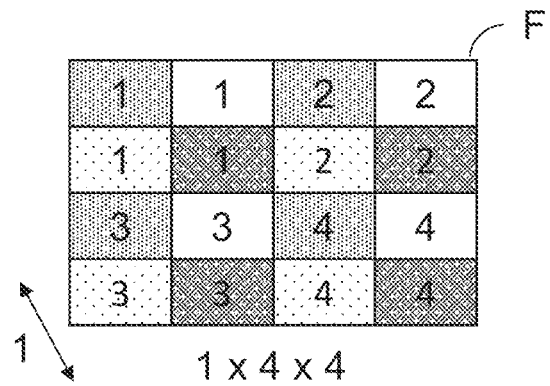
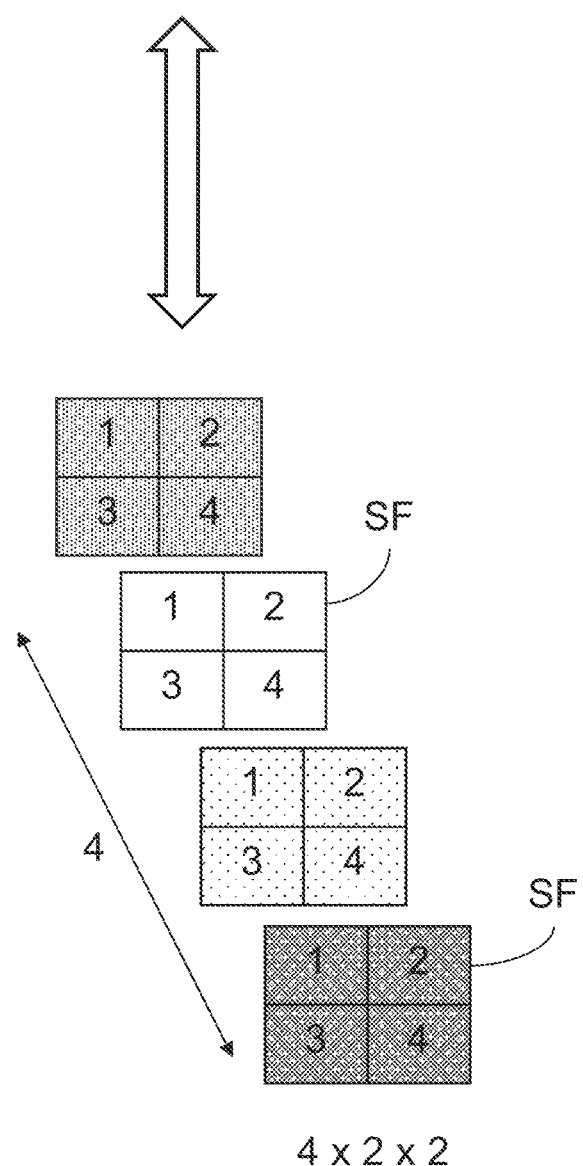

SENSOR DEVICE AND METHOD FOR OPERATING A SENSOR DEVICE

CROSS-REFERENCE TO RELATED APPLICATIONS

This application is a Continuation-In-Part of PCT Application PCT/EP2023/072189 filed Aug. 10, 2023, which claims priority of EP Application 23164426.1 filed Mar. 27, 2023, the entire contents of each of which is incorporated herein by reference.

FIELD

The present technology relates to a sensor device and a method for operating a sensor device, in particular, to a sensor device and a method for operating a sensor device that allows an improved processing of sensor data.

BACKGROUND

Presently, sensor data obtained in imaging systems like active pixel sensors, APS, and dynamic/event vision sensors, DVS/EVS, are further processed to give estimates on the observed scenes. This is often done by using machine learning algorithms that are trained to fulfill certain tasks in order to generate the desired estimates. Here, it is sometimes difficult to extract meaningful and useful information from the sensor data to fulfill a given task in an efficient manner regarding processing resources and energy consumption.

Improved sensor devices and methods for operating these sensor devices are desirable that mitigate this problem.

SUMMARY

To this end, a sensor device is provided that comprises a vision sensor that comprises a pixel array having a plurality of pixels each being configured to receive light and to perform photoelectric conversion to generate an electrical signal, based on which electrical signals a data stream is formed, an encoding unit that receives the data stream and generates a series of representations that represent states of the data stream, a trigger unit that is configured to receive a current representation from the encoding unit, to compare the current representation with a reference representation, and to generate trigger signal based on said comparison, and a processing unit that is configured to receive the trigger signals and to carry out predetermined processing based on representations for which the predetermined processing was indicated to be allowed by the respective trigger signal. Here, the processing unit is configured to use a first machine learning module to carry out the predetermined processing.

Further, a method for operating an according sensor device is provided, which comprises: by a vision sensor that comprises a pixel array having a plurality of pixels each being configured to receive light and to perform photoelectric conversion to generate an electrical signal, forming a data stream based on the generated electrical signals; by an encoding unit, receiving the data stream and generating a series of representations that represent states of the data stream; by a trigger unit, receiving a current representation from the encoding unit, comparing the current representation with a reference representation, and generating trigger signals based on said comparison; by a processing unit, receiving the trigger signals and carrying out a predetermined processing by using a first machine learning module based on representations for which the predetermined processing was indicated to be allowed by the respective trigger signal.

By pre-processing the sensor data such as to form a representation of their state and by deciding which data to process further by simple comparison it is possible to improve the results of a machine learning module that carries out the predetermined processing, i.e. the desired task In particular this is achieved by ensuring that data input for the predetermined processing is optimized for the task at hand. In particular, only information truly necessary for the task processing is forwarded and unnecessary information is removed that would only lead to an increase of the processing and energy resources that are needed without improving the result of the processing.

BRIEF DESCRIPTION OF DRAWINGS

FIG. 21 is a schematic illustration of a de-shuffling algorithm.

DETAILED DESCRIPTION

The present disclosure is directed to mitigating problems related to processing of data of imaging sensors. The solutions to these problems discussed below are applicable to all according sensor types. They are particularly relevant for event based/dynamic vision sensors, EVS/DVS, since the sparsity of the sensor data generated for these sensors allows particular improvements of the efficiency of processing these data. In order to simplify the description and also in order to cover an important application example, the present description is focused therefore without prejudice on EVS/DVS. However, it has to be understood that although in the following reference will be made to the circuitry of EVS/DVS, the discussed solutions can be applied in principle to all pixel-based sensor devices. The discussed sensor devices may be implemented in any imaging sensor setup such as e.g. smartphone cameras, scientific devices, automotive video sensors or the like.

First, a possible implementation of a EVS/DVS will be described. This is of course purely exemplary. It is to be understood that EVSs/DVSs could also be implemented differently.

Figure 1:
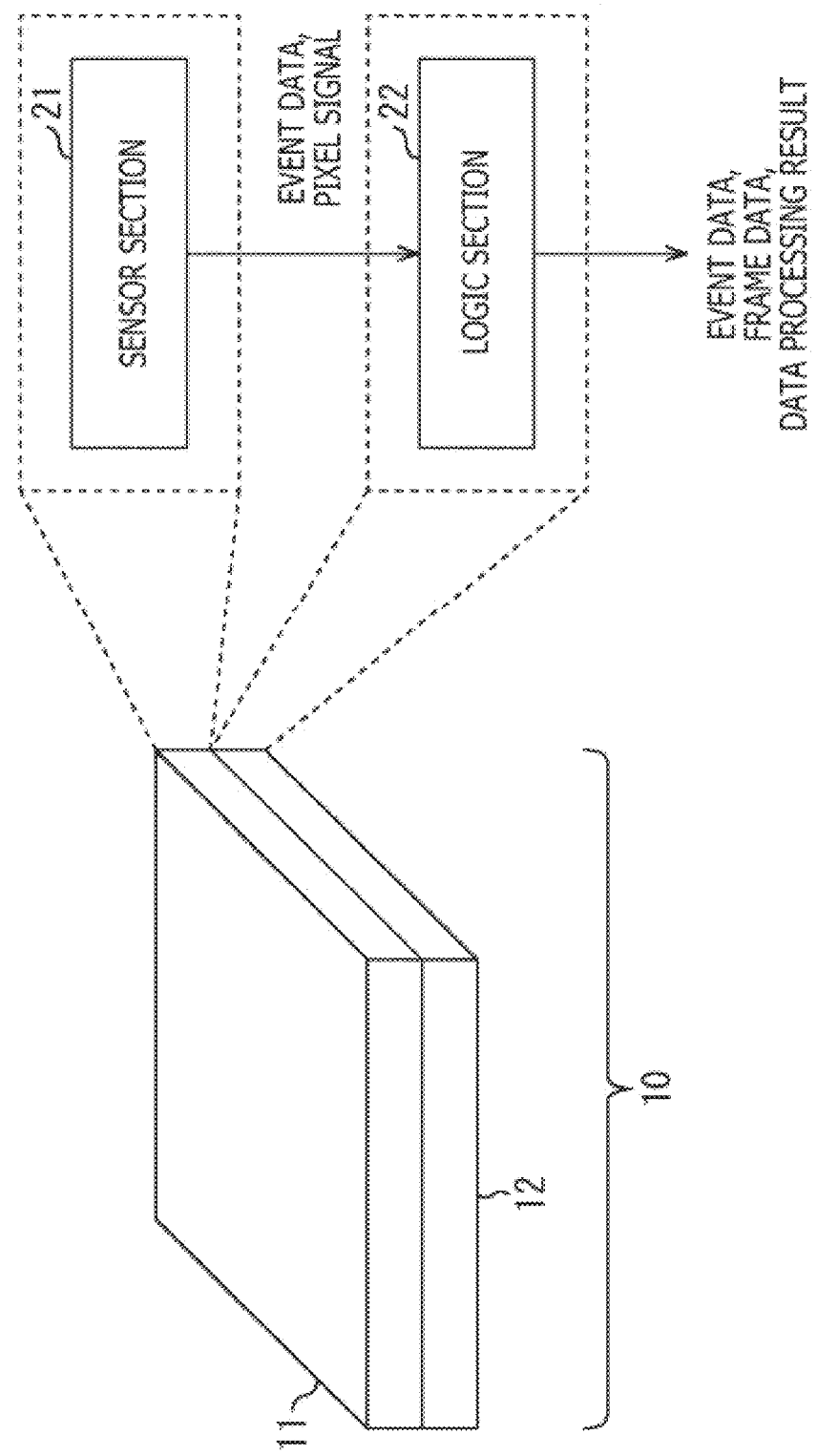
FIG. 1 is a schematic diagram of a sensor device.

FIG. 1 is a diagram illustrating a configuration example of a sensor device 10, which is in the example of FIG. 1 constituted by a sensor chip.

The sensor device 10 is a single-chip semiconductor chip and includes a sensor die (substrate) 11, which serves as a plurality of dies (substrates), and a logic die 12 that are stacked. Note that, the sensor device 10 can also include only a single die or three or more stacked dies.

In the sensor device 10 of FIG. 1, the sensor die 11 includes (a circuit serving as) a sensor section 21, and the logic die 12 includes a logic section 22. Note that, the sensor section 21 can be partly formed on the logic die 12. Further, the logic section 22 can be partly formed on the sensor die 11.

The sensor section 21 includes pixels configured to perform photoelectric conversion on incident light to generate electrical signals, and generates event data indicating the occurrence of events that are changes in the electrical signal of the pixels. The sensor section 21 supplies the event data to the logic section 22. That is, the sensor section 21 performs imaging of performing, in the pixels, photoelectric conversion on incident light to generate electrical signals, similarly to a synchronous image sensor, for example. The sensor section 21, however, generates event data indicating the occurrence of events that are changes in the electrical signal of the pixels instead of generating image data in a frame format (frame data). The sensor section 21 outputs, to the logic section 22, the event data obtained by the imaging.

Here, the synchronous image sensor is an image sensor configured to perform imaging in synchronization with a vertical synchronization signal and output frame data that is image data in a frame format. The sensor section 21 can be regarded as asynchronous (an asynchronous image sensor) in contrast to the synchronous image sensor, since the sensor section 21 does not operate in synchronization with a vertical synchronization signal when outputting event data. In particular, the sensor section 21 can output event data with a temporal precision of $10^{-6}$ s.

Note that, the sensor section 21 may generate and output, other than event data, frame data, similarly to the synchronous image sensor. In addition, the sensor section 21 can output, together with event data, electrical signals of pixels in which events have occurred, as pixel signals that are pixel values of the pixels in frame data.

The logic section 22 controls the sensor section 21 as needed. Further, the logic section 22 performs various types of data processing, such as data processing of generating frame data on the basis of event data from the sensor section 21 and image processing on frame data from the sensor section 21 or frame data generated on the basis of the event data from the sensor section 21, and outputs data processing results obtained by performing the various types of data processing on the event data and the frame data. The logic section 22 may implement the functions of a control unit as described below.

Figure 2:
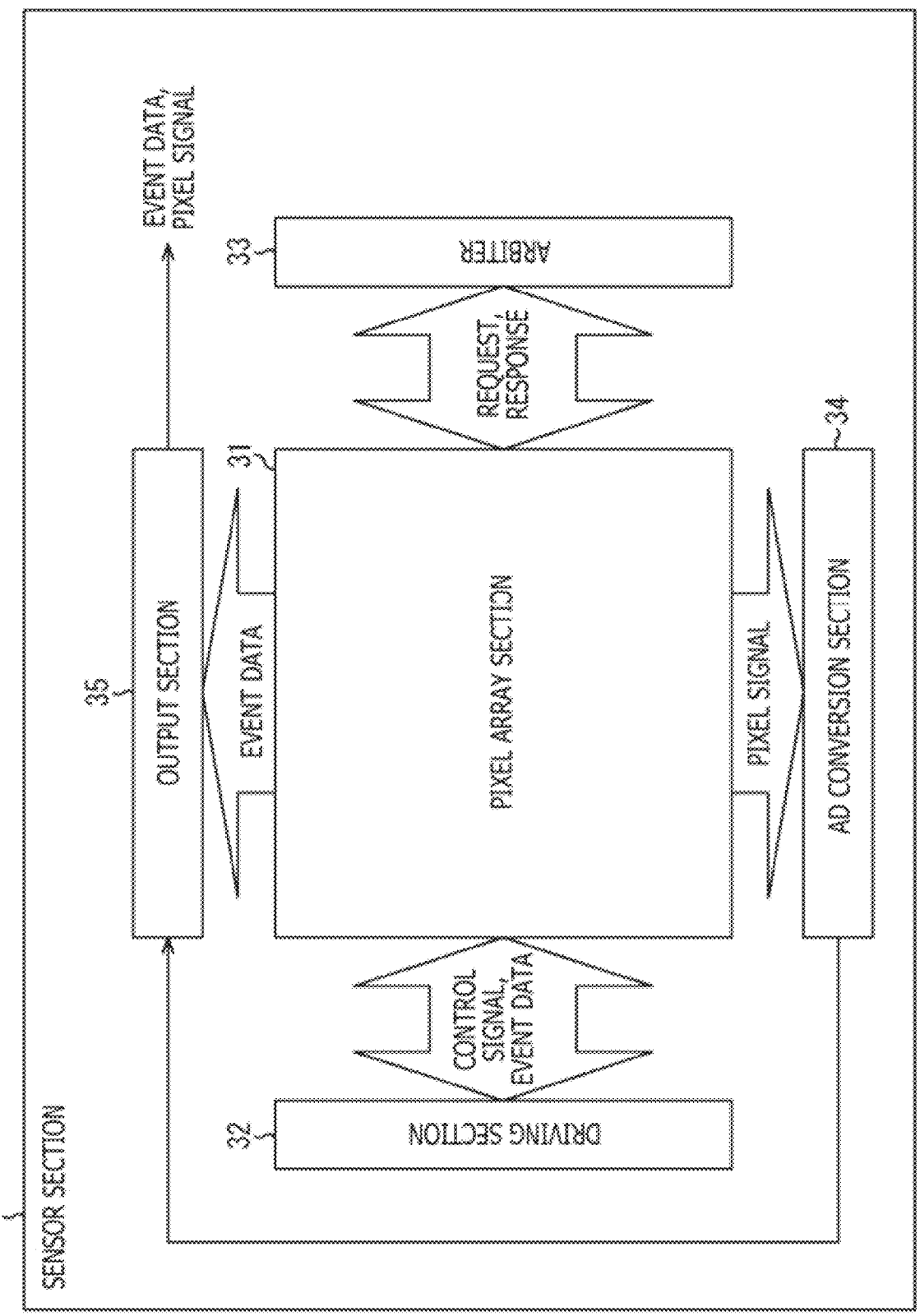
FIG. 2 is a schematic block diagram of a sensor section.

FIG. 2 is a block diagram illustrating a configuration example of the sensor section 21 of FIG. 1.

The sensor section 21 includes a pixel array section 31, a driving section 32, an arbiter 33, an AD (Analog to Digital) conversion section 34, and an output section 35.

The pixel array section 31 includes a plurality of pixels 51 (FIG. 3) arrayed in a two-dimensional lattice pattern. The pixel array section 31 detects, in a case where a change larger than a predetermined threshold (including a change equal to or larger than the threshold as needed) has occurred in (a voltage corresponding to) a photocurrent that is an electrical signal generated by photoelectric conversion in the pixel 51, the change in the photocurrent as an event. In a case of detecting an event, the pixel array section 31 outputs, to the arbiter 33, a request for requesting the output of event data indicating the occurrence of the event. Then, in a case of receiving a response indicating event data output permission from the arbiter 33, the pixel array section 31 outputs the event data to the driving section 32 and the output section 35. In addition, the pixel array section 31 may output an electrical signal of the pixel 51 in which the event has been detected to the AD conversion section 34.

The driving section 32 supplies control signals to the pixel array section 31 to drive the pixel array section 31. For example, the driving section 32 drives the pixel 51 regarding which the pixel array section 31 has output event data, so that the pixel 51 in question supplies (outputs) a pixel signal to the AD conversion section 34.

The arbiter 33 arbitrates the requests for requesting the output of event data from the pixel array section 31, and returns responses indicating event data output permission or prohibition to the pixel array section 31.

The AD conversion section 34 includes, for example, a single-slope ADC (AD converter) (not illustrated) in each column of pixel blocks 41 (FIG. 3) described later, for example. The AD conversion section 34 performs, with the ADC in each column, AD conversion on pixel signals of the pixels 51 of the pixel blocks 41 in the column, and supplies the resultant to the output section 35. Note that, the AD conversion section 34 can perform CDS (Correlated Double Sampling) together with pixel signal AD conversion.

The output section 35 performs necessary processing on the pixel signals from the AD conversion section 34 and the event data from the pixel array section 31 and supplies the resultant to the logic section 22 (FIG. 1).

Here, a change in the photocurrent generated in the pixel 51 can be recognized as a change in the amount of light entering the pixel 51, so that it can also be said that an event is a change in light amount (a change in light amount larger than the threshold) in the pixel 51.

Event data indicating the occurrence of an event at least includes location information (coordinates or the like) indicating the location of a pixel block in which a change in light amount, which is the event, has occurred. Besides, the event data can also include the polarity (positive or negative) of the change in light amount.

With regard to the series of event data that is output from the pixel array section 31 at timings at which events have occurred, it can be said that, as long as the event data interval is the same as the event occurrence interval, the event data implicitly includes time point information indicating (relative) time points at which the events have occurred. However, for example, when the event data is stored in a memory and the event data interval is no longer the same as the event occurrence interval, the time point information implicitly included in the event data is lost. Thus, the output section 35 includes, in event data, time point information indicating (relative) time points at which events have occurred, such as timestamps, before the event data interval is changed from the event occurrence interval. The processing of including time point information in event data can be performed in any block other than the output section 35 as long as the processing is performed before time point information implicitly included in event data is lost.

Figure 3:
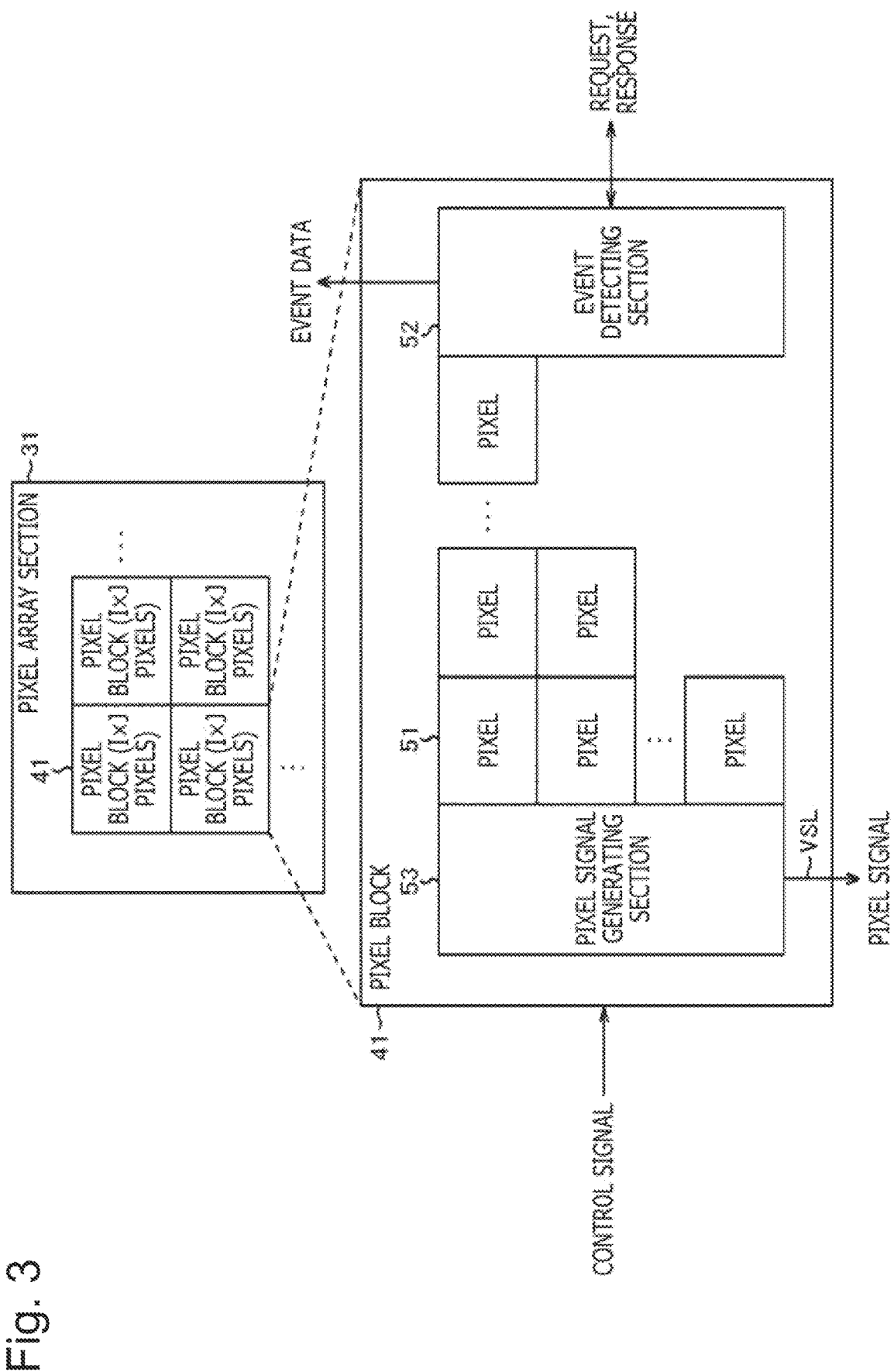
FIG. 3 is a schematic block diagram of a pixel array section.

FIG. 3 is a block diagram illustrating a configuration example of the pixel array section 31 of FIG. 2.

The pixel array section 31 includes the plurality of pixel blocks 41. The pixel block 41 includes the I×J pixels 51 that are one or more pixels arrayed in I rows and J columns (I and J are integers), an event detecting section 52, and a pixel signal generating section 53. The one or more pixels 51 in the pixel block 41 share the event detecting section 52 and the pixel signal generating section 53. Further, in each column of the pixel blocks 41, a VSL (Vertical Signal Line) for connecting the pixel blocks 41 to the ADC of the AD conversion section 34 is wired.

The pixel 51 receives light incident from an object and performs photoelectric conversion to generate a photocurrent serving as an electrical signal. The pixel 51 supplies the photocurrent to the event detecting section 52 under the control of the driving section 32.

The event detecting section 52 detects, as an event, a change larger than the predetermined threshold in photocurrent from each of the pixels 51, under the control of the driving section 32. In a case of detecting an event, the event detecting section 52 supplies, to the arbiter 33 (FIG. 2), a request for requesting the output of event data indicating the occurrence of the event. Then, when receiving a response indicating event data output permission to the request from the arbiter 33, the event detecting section 52 outputs the event data to the driving section 32 and the output section 35.

The pixel signal generating section 53 generates, in the case where the event detecting section 52 has detected an event, a voltage corresponding to a photocurrent from the pixel 51 as a pixel signal, and supplies the voltage to the AD conversion section 34 through the VSL, under the control of the driving section 32.

Here, detecting a change larger than the predetermined threshold in photocurrent as an event can also be recognized as detecting, as an event, absence of change larger than the predetermined threshold in photocurrent. The pixel signal generating section 53 can generate a pixel signal in the case where absence of change larger than the predetermined threshold in photocurrent has been detected as an event as well as in the case where a change larger than the predetermined threshold in photocurrent has been detected as an event.

Figure 4:
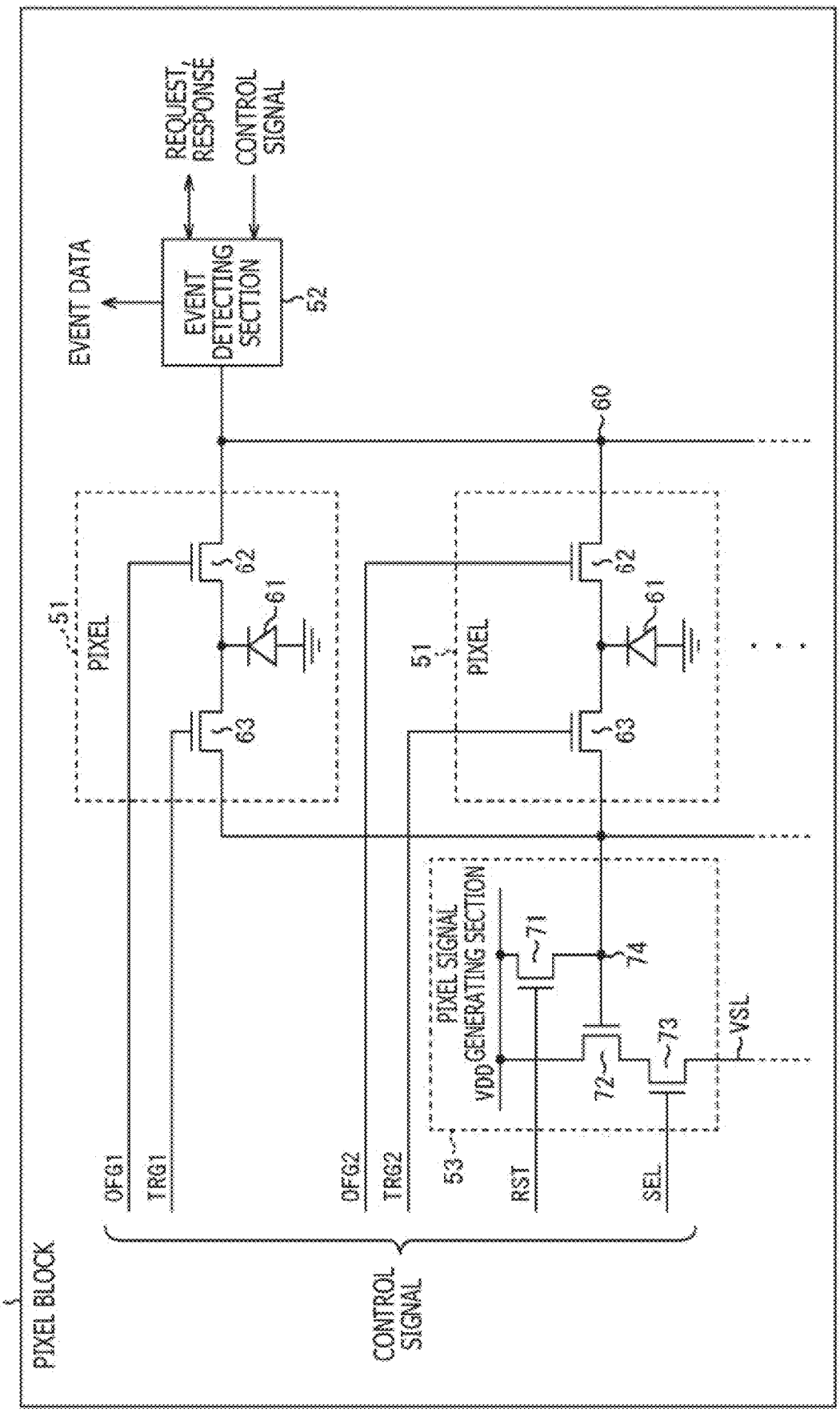
FIG. 4 is a schematic circuit diagram of a pixel block.

FIG. 4 is a circuit diagram illustrating a configuration example of the pixel block 41.

The pixel block 41 includes, as described with reference to FIG. 3, the pixels 51, the event detecting section 52, and the pixel signal generating section 53.

The pixel 51 includes a photoelectric conversion element 61 and transfer transistors 62 and 63.

The photoelectric conversion element 61 includes, for example, a PD (Photodiode). The photoelectric conversion element 61 receives incident light and performs photoelectric conversion to generate charges.

The transfer transistor 62 includes, for example, an N (Negative)-type MOS (Metal-Oxide-Semiconductor) FET (Field Effect Transistor). The transfer transistor 62 of the n-th pixel 51 of the I×J pixels 51 in the pixel block 41 is turned on or off in response to a control signal OFGn supplied from the driving section 32 (FIG. 2). When the transfer transistor 62 is turned on, charges generated in the photoelectric conversion element 61 are transferred (supplied) to the event detecting section 52, as a photocurrent.

The transfer transistor 63 includes, for example, an N-type MOSFET. The transfer transistor 63 of the n-th pixel 51 of the I×J pixels 51 in the pixel block 41 is turned on or off in response to a control signal TRGn supplied from the driving section 32. When the transfer transistor 63 is turned on, charges generated in the photoelectric conversion element 61 are transferred to an FD 74 of the pixel signal generating section 53.

The I×J pixels 51 in the pixel block 41 are connected to the event detecting section 52 of the pixel block 41 through nodes 60. Thus, photocurrents generated in (the photoelectric conversion elements 61 of) the pixels 51 are supplied to the event detecting section 52 through the nodes 60. As a result, the event detecting section 52 receives the sum of photocurrents from all the pixels 51 in the pixel block 41. Thus, the event detecting section 52 detects, as an event, a change in sum of photocurrents supplied from the I×J pixels 51 in the pixel block 41.

The pixel signal generating section 53 includes a reset transistor 71, an amplification transistor 72, a selection transistor 73, and the FD (Floating Diffusion) 74.

The reset transistor 71, the amplification transistor 72, and the selection transistor 73 include, for example, N-type MOSFETs.

The reset transistor 71 is turned on or off in response to a control signal RST supplied from the driving section 32 (FIG. 2). When the reset transistor 71 is turned on, the FD 74 is connected to a power supply VDD, and charges accumulated in the FD 74 are thus discharged to the power supply VDD. With this, the FD 74 is reset.

The amplification transistor 72 has a gate connected to the FD 74, a drain connected to the power supply VDD, and a source connected to the VSL through the selection transistor 73. The amplification transistor 72 is a source follower and outputs a voltage (electrical signal) corresponding to the voltage of the FD 74 supplied to the gate to the VSL through the selection transistor 73.

The selection transistor 73 is turned on or off in response to a control signal SEL supplied from the driving section 32. When the selection transistor 73 is turned on, a voltage corresponding to the voltage of the FD 74 from the amplification transistor 72 is output to the VSL.

The FD 74 accumulates charges transferred from the photoelectric conversion elements 61 of the pixels 51 through the transfer transistors 63, and converts the charges to voltages.

With regard to the pixels 51 and the pixel signal generating section 53, which are configured as described above, the driving section 32 turns on the transfer transistors 62 with control signals OFGn, so that the transfer transistors 62 supply, to the event detecting section 52, photocurrents based on charges generated in the photoelectric conversion elements 61 of the pixels 51. With this, the event detecting section 52 receives a current that is the sum of the photocurrents from all the pixels 51 in the pixel block 41, which might also be only a single pixel.

When the event detecting section 52 detects, as an event, a change in photocurrent (sum of photocurrents) in the pixel block 41, the driving section 32 turns off the transfer transistors 62 of all the pixels 51 in the pixel block 41, to thereby stop the supply of the photocurrents to the event detecting section 52. Then, the driving section 32 sequentially turns on, with the control signals TRGn, the transfer transistors 63 of the pixels 51 in the pixel block 41 in which the event has been detected, so that the transfer transistors 63 transfers charges generated in the photoelectric conversion elements 61 to the FD 74. The FD 74 accumulates the charges transferred from (the photoelectric conversion elements 61 of) the pixels 51. Voltages corresponding to the charges accumulated in the FD 74 are output to the VSL, as pixel signals of the pixels 51, through the amplification transistor 72 and the selection transistor 73.

As described above, in the sensor section 21 (FIG. 2), only pixel signals of the pixels 51 in the pixel block 41 in which an event has been detected are sequentially output to the VSL. The pixel signals output to the VSL are supplied to the AD conversion section 34 to be subjected to AD conversion.

Here, in the pixels 51 in the pixel block 41, the transfer transistors 63 can be turned on not sequentially but simultaneously. In this case, the sum of pixel signals of all the pixels 51 in the pixel block 41 can be output.

In the pixel array section 31 of FIG. 3, the pixel block 41 includes one or more pixels 51, and the one or more pixels 51 share the event detecting section 52 and the pixel signal generating section 53. Thus, in the case where the pixel block 41 includes a plurality of pixels 51, the numbers of the event detecting sections 52 and the pixel signal generating sections 53 can be reduced as compared to a case where the event detecting section 52 and the pixel signal generating section 53 are provided for each of the pixels 51, with the result that the scale of the pixel array section 31 can be reduced.

Note that, in the case where the pixel block 41 includes a plurality of pixels 51, the event detecting section 52 can be provided for each of the pixels 51. In the case where the plurality of pixels 51 in the pixel block 41 share the event detecting section 52, events are detected in units of the pixel blocks 41. In the case where the event detecting section 52 is provided for each of the pixels 51, however, events can be detected in units of the pixels 51.

Yet, even in the case where the plurality of pixels 51 in the pixel block 41 share the single event detecting section 52, events can be detected in units of the pixels 51 when the transfer transistors 62 of the plurality of pixels 51 are temporarily turned on in a time-division manner.

Further, in a case where there is no need to output pixel signals, the pixel block 41 can be formed without the pixel signal generating section 53. In the case where the pixel block 41 is formed without the pixel signal generating section 53, the sensor section 21 can be formed without the AD conversion section 34 and the transfer transistors 63. In this case, the scale of the sensor section 21 can be reduced.

The sensor will then output the address of the pixel (block) in which the event occurred, if necessary with a time stamp.

Figure 5:
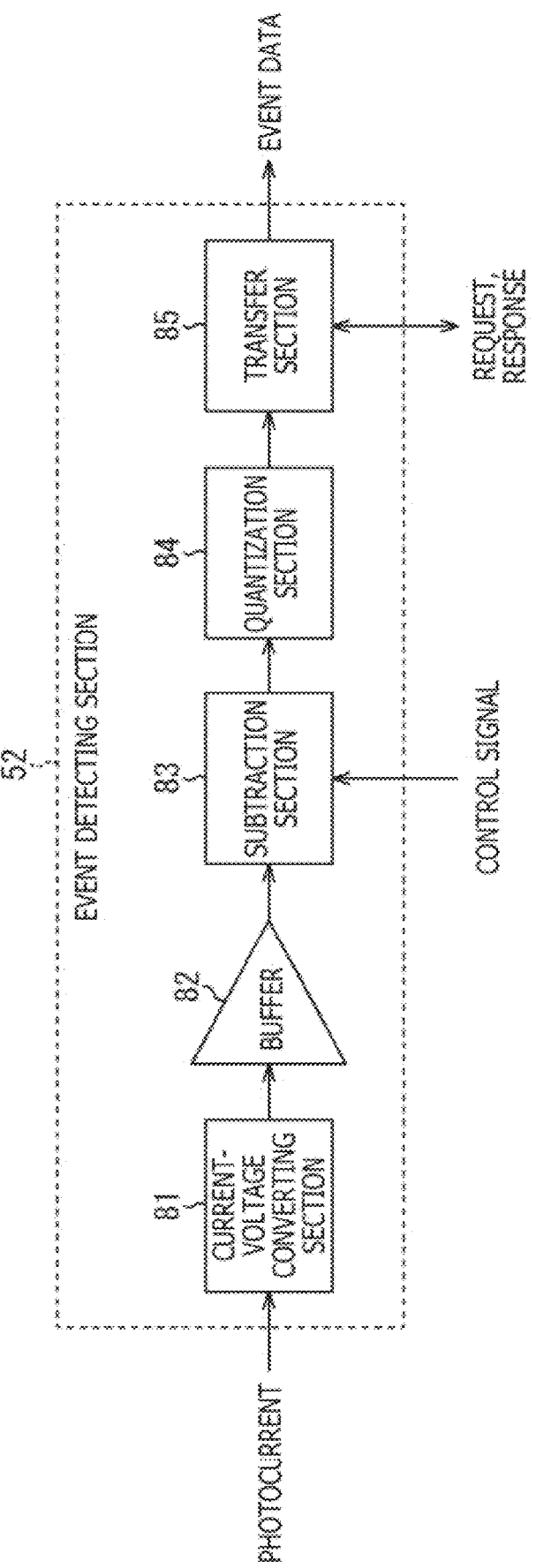
FIG. 5 is a schematic block diagram illustrating of an event detecting section.

FIG. 5 is a block diagram illustrating a configuration example of the event detecting section 52 of FIG. 3.

The event detecting section 52 includes a current-voltage converting section 81, a buffer 82, a subtraction section 83, a quantization section 84, and a transfer section 85.

The current-voltage converting section 81 converts (a sum of) photocurrents from the pixels 51 to voltages corresponding to the logarithms of the photocurrents (hereinafter also referred to as a "photovoltage") and supplies the voltages to the buffer 82.

The buffer 82 buffers photovoltages from the current-voltage converting section 81 and supplies the resultant to the subtraction section 83.

The subtraction section 83 calculates, at a timing instructed by a row driving signal that is a control signal from the driving section 32, a difference between the current photovoltage and a photovoltage at a timing slightly shifted from the current time, and supplies a difference signal corresponding to the difference to the quantization section 84.

The quantization section 84 quantizes difference signals from the subtraction section 83 to digital signals and supplies the quantized values of the difference signals to the transfer section 85 as event data.

The transfer section 85 transfers (outputs), on the basis of event data from the quantization section 84, the event data to the output section 35. That is, the transfer section 85 supplies a request for requesting the output of the event data to the arbiter 33. Then, when receiving a response indicating event data output permission to the request from the arbiter 33, the transfer section 85 outputs the event data to the output section 35.

Figure 6:
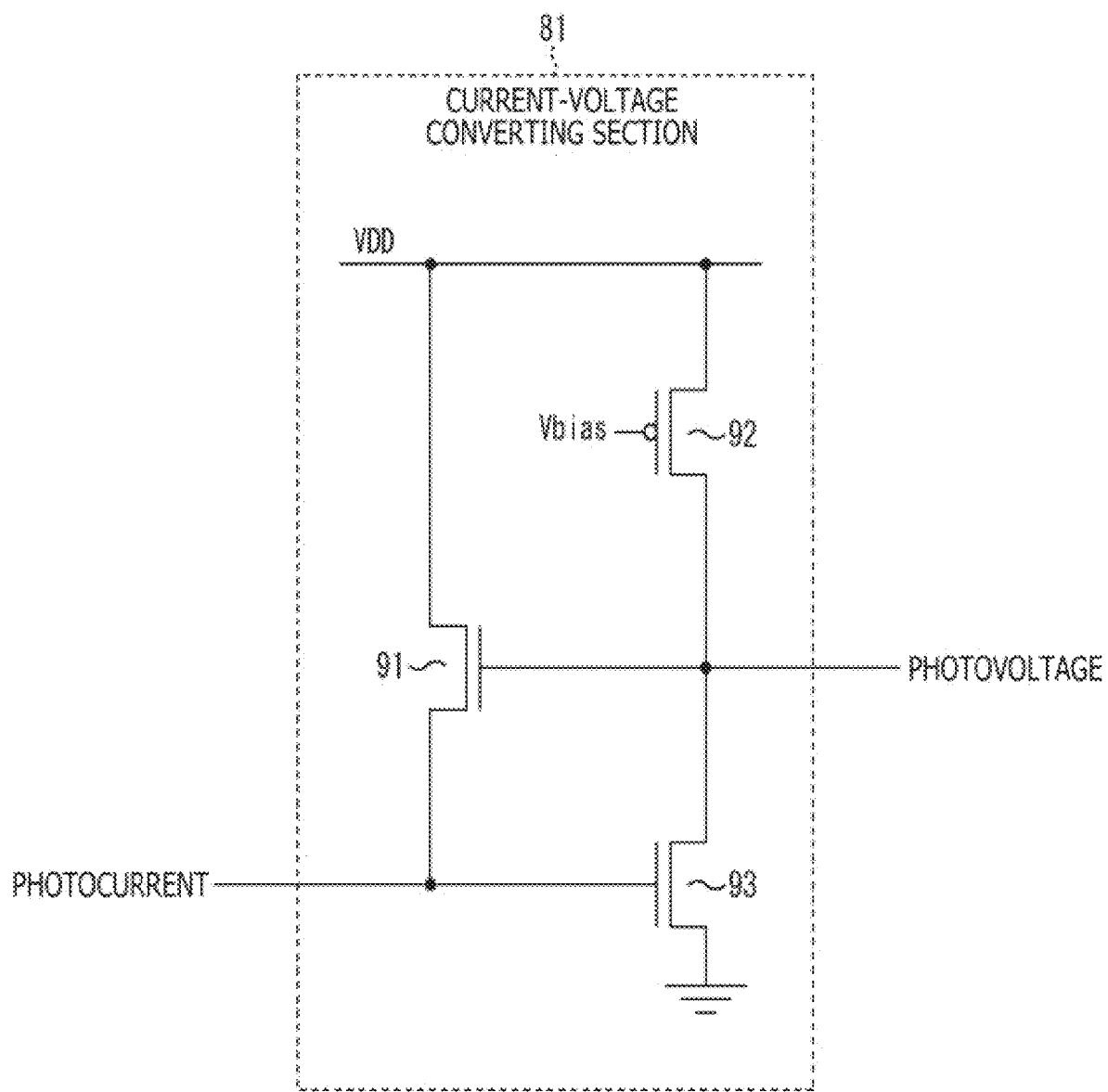
FIG. 6 is a schematic circuit diagram of a current-voltage converting section.

FIG. 6 is a circuit diagram illustrating a configuration example of the current-voltage converting section 81 of FIG. 5.

The current-voltage converting section 81 includes transistors 91 to 93. As the transistors 91 and 93, for example, N-type MOSFETs can be employed. As the transistor 92, for example, a P-type MOSFET can be employed.

The transistor 91 has a source connected to the gate of the transistor 93, and a photocurrent is supplied from the pixel 51 to the connecting point between the source of the transistor 91 and the gate of the transistor 93. The transistor 91 has a drain connected to the power supply VDD and a gate connected to the drain of the transistor 93.

The transistor 92 has a source connected to the power supply VDD and a drain connected to the connecting point between the gate of the transistor 91 and the drain of the transistor 93. A predetermined bias voltage Vbias is applied to the gate of the transistor 92. With the bias voltage Vbias, the transistor 92 is turned on or off, and the operation of the current-voltage converting section 81 is turned on or off depending on whether the transistor 92 is turned on or off.

The source of the transistor 93 is grounded.

In the current-voltage converting section 81, the transistor 91 has the drain connected on the power supply VDD side. The source of the transistor 91 is connected to the pixels 51 (FIG. 4), so that photocurrents based on charges generated in the photoelectric conversion elements 61 of the pixels 51 flow through the transistor 91 (from the drain to the source). The transistor 91 operates in a subthreshold region, and at the gate of the transistor 91, photovoltages corresponding to the logarithms of the photocurrents flowing through the transistor 91 are generated. As described above, in the current-voltage converting section 81, the transistor 91 converts photocurrents from the pixels 51 to photovoltages corresponding to the logarithms of the photocurrents.

In the current-voltage converting section 81, the transistor 91 has the gate connected to the connecting point between the drain of the transistor 92 and the drain of the transistor 93, and the photovoltages are output from the connecting point in question.

Figure 7:
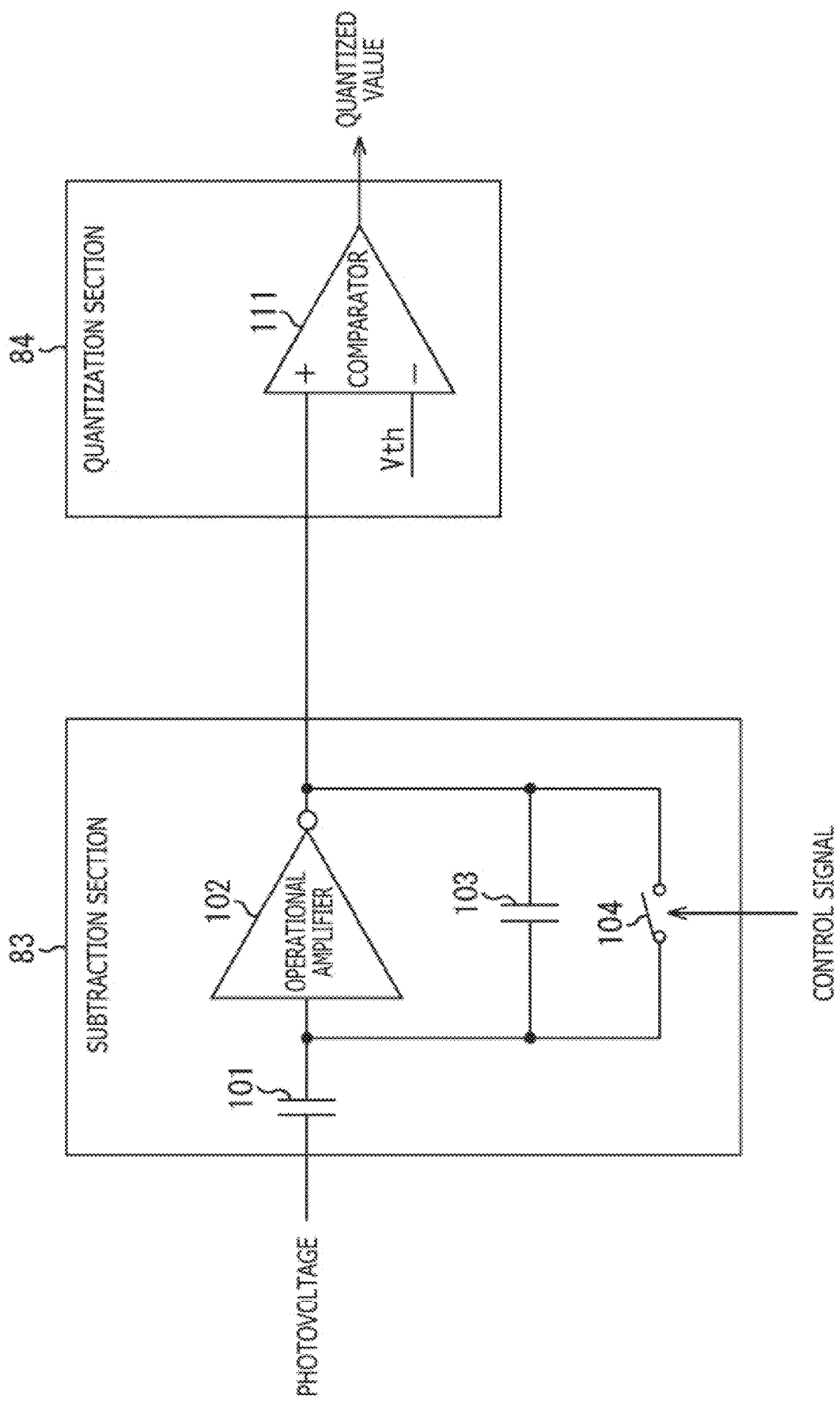
FIG. 7 is a schematic circuit diagram of a subtraction section and a quantization section.

FIG. 7 is a circuit diagram illustrating configuration examples of the subtraction section 83 and the quantization section 84 of FIG. 5.

The subtraction section 83 includes a capacitor 101, an operational amplifier 102, a capacitor 103, and a switch 104. The quantization section 84 includes a comparator 111.

The capacitor 101 has one end connected to the output terminal of the buffer 82 (FIG. 5) and the other end connected to the input terminal (inverting input terminal) of the operational amplifier 102. Thus, photovoltages are input to the input terminal of the operational amplifier 102 through the capacitor 101.

The operational amplifier 102 has an output terminal connected to the non-inverting input terminal (+) of the comparator 111.

The capacitor 103 has one end connected to the input terminal of the operational amplifier 102 and the other end connected to the output terminal of the operational amplifier 102.

The switch 104 is connected to the capacitor 103 to switch the connections between the ends of the capacitor 103. The switch 104 is turned on or off in response to a row driving signal that is a control signal from the driving section 32, to thereby switch the connections between the ends of the capacitor 103.

A photovoltage on the buffer 82 (FIG. 5) side of the capacitor 101 when the switch 104 is on is denoted by Vinit, and the capacitance (electrostatic capacitance) of the capacitor 101 is denoted by C1. The input terminal of the operational amplifier 102 serves as a virtual ground terminal, and a charge Qinit that is accumulated in the capacitor 101 in the case where the switch 104 is on is expressed by Expression (1).

$$Q\text{init} = C1 \times V\text{init} \quad (1)$$

Further, in the case where the switch 104 is on, the connection between the ends of the capacitor 103 is cut (short-circuited), so that no charge is accumulated in the capacitor 103.

When a photovoltage on the buffer 82 (FIG. 5) side of the capacitor 101 in the case where the switch 104 has thereafter been turned off is denoted by Vafter, a charge Qafter that is accumulated in the capacitor 101 in the case where the switch 104 is off is expressed by Expression (2).

$$Q\text{after} = C1 \times V\text{after} \quad (2)$$

When the capacitance of the capacitor 103 is denoted by C2 and the output voltage of the operational amplifier 102 is denoted by Vout, a charge Q2 that is accumulated in the capacitor 103 is expressed by Expression (3).

$$Q2 = -C2 \times V\text{out} \quad (3)$$

Since the total amount of charges in the capacitors 101 and 103 does not change before and after the switch 104 is turned off, Expression (4) is established.

$$Q\text{init} = Q\text{after} + Q2 \quad (4)$$

When Expression (1) to Expression (3) are substituted for Expression (4), Expression (5) is obtained.

$$V\text{out} = -(C1/C2) \times (V\text{after} - V\text{init}) \quad (5)$$

With Expression (5), the subtraction section 83 subtracts the photovoltage Vinit from the photovoltage Vafter, that is, calculates the difference signal (Vout) corresponding to a difference Vafter−Vinit between the photovoltages Vafter and Vinit. With Expression (5), the subtraction gain of the subtraction section 83 is C1/C2. Since the maximum gain is normally desired, C1 is preferably set to a large value and C2 is preferably set to a small value. Meanwhile, when C2 is too small, kTC noise increases, resulting in a risk of deteriorated noise characteristics. Thus, the capacitance C2 can only be reduced in a range that achieves acceptable noise. Further, since the pixel blocks 41 each have installed therein the event detecting section 52 including the subtraction section 83, the capacitances C1 and C2 have space constraints. In consideration of these matters, the values of the capacitances C1 and C2 are determined.

The comparator 111 compares a difference signal from the subtraction section 83 with a predetermined threshold (voltage) Vth (>0) applied to the inverting input terminal (−), thereby quantizing the difference signal. The comparator 111 outputs the quantized value obtained by the quantization to the transfer section 85 as event data.

For example, in a case where a difference signal is larger than the threshold Vth, the comparator 111 outputs an H (High) level indicating 1, as event data indicating the occurrence of an event. In a case where a difference signal is not larger than the threshold Vth, the comparator 111 outputs an L (Low) level indicating 0, as event data indicating that no event has occurred.

The transfer section 85 supplies a request to the arbiter 33 in a case where it is confirmed on the basis of event data from the quantization section 84 that a change in light amount that is an event has occurred, that is, in the case where the difference signal (Vout) is larger than the threshold Vth. When receiving a response indicating event data output permission, the transfer section 85 outputs the event data indicating the occurrence of the event (for example, H level) to the output section 35.

The output section 35 includes, in event data from the transfer section 85, location/address information regarding (the pixel block 41 including) the pixel 51 in which an event indicated by the event data has occurred and time point information indicating a time point at which the event has occurred, and further, as needed, the polarity of a change in light amount that is the event, i.e. whether the intensity did increase or decrease. The output section 35 outputs the event data.

As the data format of event data including location information regarding the pixel 51 in which an event has occurred, time point information indicating a time point at which the event has occurred, and the polarity of a change in light amount that is the event, for example, the data format called "AER (Address Event Representation)" can be employed.

Note that, a gain A of the entire event detecting section 52 is expressed by the following expression where the gain of the current-voltage converting section 81 is denoted by $CG_{log}$ and the gain of the buffer 82 is 1.

$$A = CG_{log} C1/C2 \left( \sum i_{photo\_n} \right) \quad (6)$$

Here, $i_{photo\_n}$ denotes a photocurrent of the n-th pixel 51 of the I×J pixels 51 in the pixel block 41. In Expression (6), Σ denotes the summation of n that takes integers ranging from 1 to I×J.

Note that, the pixel 51 can receive any light as incident light with an optical filter through which predetermined light passes, such as a color filter. For example, in a case where the pixel 51 receives visible light as incident light, event data indicates the occurrence of changes in pixel value in images including visible objects. Further, for example, in a case where the pixel 51 receives, as incident light, infrared light, millimeter waves, or the like for ranging, event data indicates the occurrence of changes in distances to objects. In addition, for example, in a case where the pixel 51 receives infrared light for temperature measurement, as incident light, event data indicates the occurrence of changes in temperature of objects. In the present embodiment, the pixel 51 is assumed to receive visible light as incident light.

Figure 8:
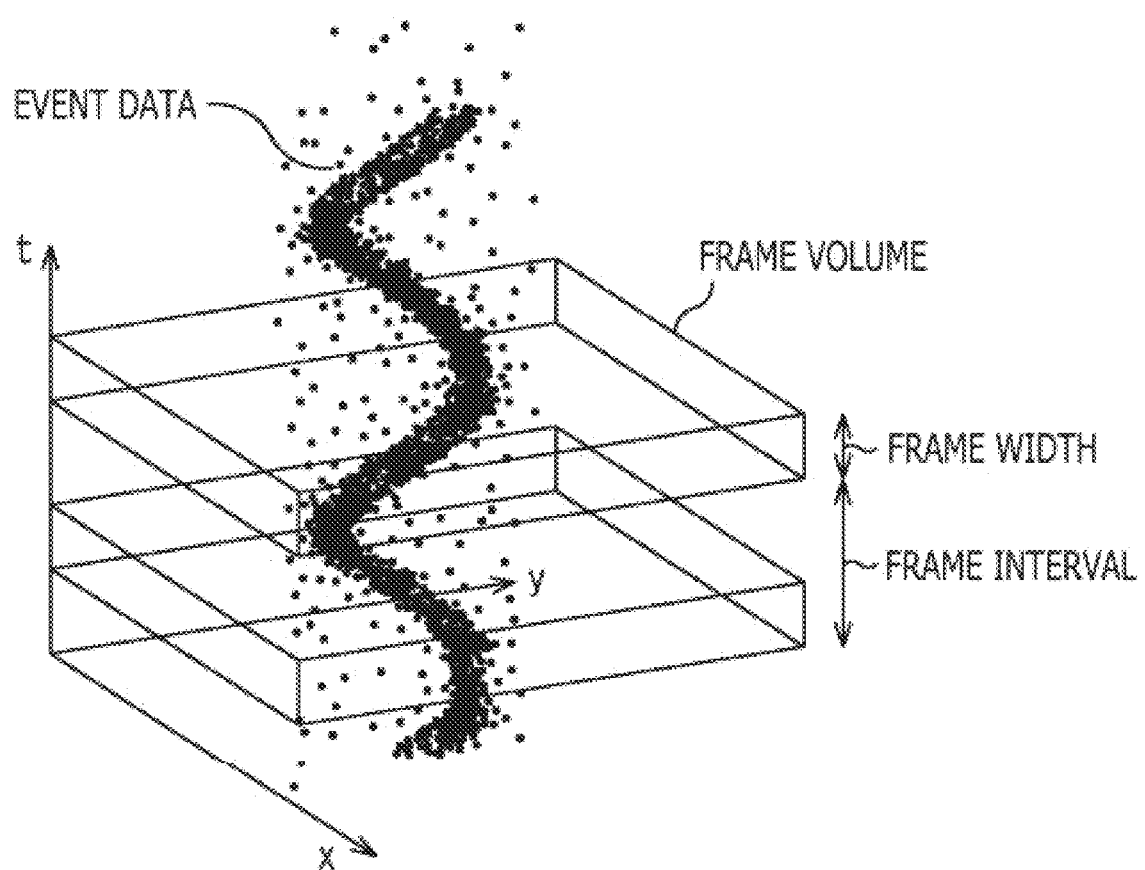
FIG. 8 is a schematic diagram of a frame data generation method based on event data.

FIG. 8 is a diagram illustrating an example of a frame data generation method based on event data.

The logic section 22 sets a frame interval and a frame width on the basis of an externally input command, for example. Here, the frame interval represents the interval of frames of frame data that is generated on the basis of event data. The frame width represents the time width of event data that is used for generating frame data on a single frame. A frame interval and a frame width that are set by the logic section 22 are also referred to as a "set frame interval" and a "set frame width," respectively.

The logic section 22 generates, on the basis of the set frame interval, the set frame width, and event data from the sensor section 21, frame data that is image data in a frame format, to thereby convert the event data to the frame data.

That is, the logic section 22 generates, in each set frame interval, frame data on the basis of event data in the set frame width from the beginning of the set frame interval.

Here, it is assumed that event data includes time point information ti indicating a time point at which an event has occurred (hereinafter also referred to as an "event time point") and coordinates (x, y) serving as location information regarding (the pixel block 41 including) the pixel 51 in which the event has occurred (hereinafter also referred to as an "event location").

In FIG. 8, in a three-dimensional space (time and space) with the x axis, the y axis, and the time axis t, points representing event data are plotted on the basis of the event time point t and the event location (coordinates) (x, y) included in the event data.

That is, when a location (x, y, t) on the three-dimensional space indicated by the event time point t and the event location (x, y) included in event data is regarded as the space-time location of an event, in FIG. 8, the points representing the event data are plotted on the space-time locations (x, y, t) of the events.

The logic section 22 starts to generate frame data on the basis of event data by using, as a generation start time point at which frame data generation starts, a predetermined time point, for example, a time point at which frame data generation is externally instructed or a time point at which the sensor device 10 is powered on.

Here, cuboids each having the set frame width in the direction of the time axis t in the set frame intervals, which appear from the generation start time point, are referred to as a "frame volume." The size of the frame volume in the x-axis direction or the y-axis direction is equal to the number of the pixel blocks 41 or the pixels 51 in the x-axis direction or the y-axis direction, for example.

The logic section 22 generates, in each set frame interval, frame data on a single frame on the basis of event data in the frame volume having the set frame width from the beginning of the set frame interval.

Frame data can be generated by, for example, setting white to a pixel (pixel value) in a frame at the event location (x, y) included in event data and setting a predetermined color such as gray to pixels at other locations in the frame.

Besides, in a case where event data includes the polarity of a change in light amount that is an event, frame data can be generated in consideration of the polarity included in the event data. For example, white can be set to pixels in the case a positive polarity, while black can be set to pixels in the case of a negative polarity.

In addition, in the case where pixel signals of the pixels 51 are also output when event data is output as described with reference to FIG. 3 and FIG. 4, frame data can be generated on the basis of the event data by using the pixel signals of the pixels 51. That is, frame data can be generated by setting, in a frame, a pixel at the event location (x, y) (in a block corresponding to the pixel block 41) included in event data to a pixel signal of the pixel 51 at the location (x, y) and setting a predetermined color such as gray to pixels at other locations.

Note that, in the frame volume, there are a plurality of pieces of event data that are different in the event time point t but the same in the event location (x, y) in some cases. In this case, for example, event data at the latest or oldest event time point t can be prioritized. Further, in the case where event data includes polarities, the polarities of a plurality of pieces of event data that are different in the event time point t but the same in the event location (x, y) can be added together, and a pixel value based on the added value obtained by the addition can be set to a pixel at the event location (x, y).

Here, in a case where the frame width and the frame interval are the same, the frame volumes are adjacent to each other without any gap. Further, in a case where the frame interval is larger than the frame width, the frame volumes are arranged with gaps. In a case where the frame width is larger than the frame interval, the frame volumes are arranged to be partly overlapped with each other.

Figure 9:
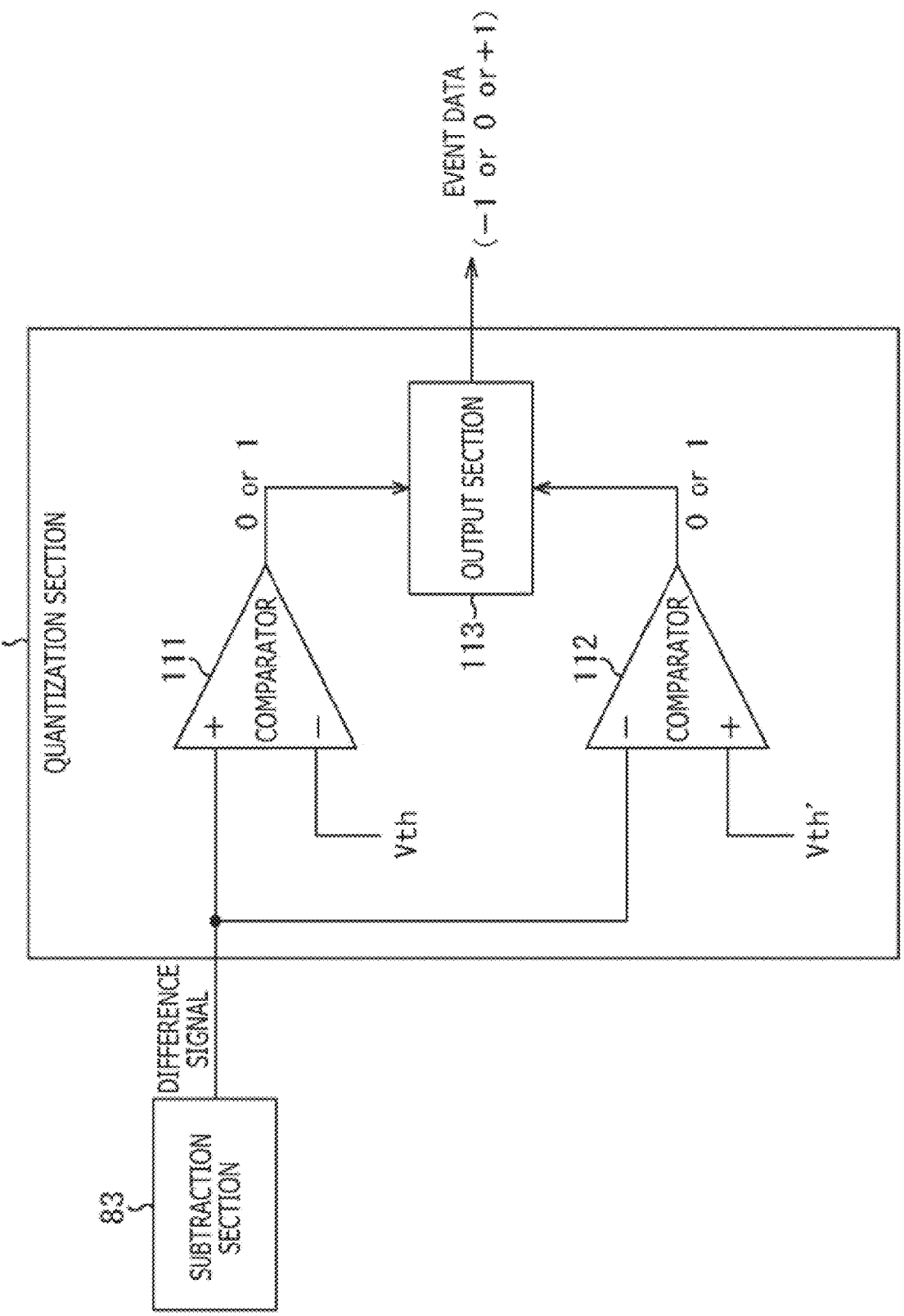
FIG. 9 is a schematic block diagram of another quantization section.

FIG. 9 is a block diagram illustrating another configuration example of the quantization section 84 of FIG. 5.

Note that, in FIG. 9, parts corresponding to those in the case of FIG. 7 are denoted by the same reference signs, and the description thereof is omitted as appropriate below.

In FIG. 9, the quantization section 84 includes comparators 111 and 112 and an output section 113.

Thus, the quantization section 84 of FIG. 9 is similar to the case of FIG. 7 in including the comparator 111. However, the quantization section 84 of FIG. 9 is different from the case of FIG. 7 in newly including the comparator 112 and the output section 113.

The event detecting section 52 (FIG. 5) including the quantization section 84 of FIG. 9 detects, in addition to events, the polarities of changes in light amount that are events.

In the quantization section 84 of FIG. 9, the comparator 111 outputs, in the case where a difference signal is larger than the threshold Vth, the H level indicating 1, as event data indicating the occurrence of an event having the positive polarity. The comparator 111 outputs, in the case where a difference signal is not larger than the threshold Vth, the L level indicating 0, as event data indicating that no event having the positive polarity has occurred.

Further, in the quantization section 84 of FIG. 9, a threshold Vth' (<Vth) is supplied to the non-inverting input terminal (+) of the comparator 112, and difference signals are supplied to the inverting input terminal (−) of the comparator 112 from the subtraction section 83. Here, for the sake of simple description, it is assumed that the threshold Vth' is equal to −Vth, for example, which needs however not to be the case.

The comparator 112 compares a difference signal from the subtraction section 83 with the threshold Vth' applied to the inverting input terminal (−), thereby quantizing the difference signal. The comparator 112 outputs, as event data, the quantized value obtained by the quantization.

For example, in a case where a difference signal is smaller than the threshold Vth' (the absolute value of the difference signal having a negative value is larger than the threshold Vth), the comparator 112 outputs the H level indicating 1, as event data indicating the occurrence of an event having the negative polarity. Further, in a case where a difference signal is not smaller than the threshold Vth' (the absolute value of the difference signal having a negative value is not larger than the threshold Vth), the comparator 112 outputs the L level indicating 0, as event data indicating that no event having the negative polarity has occurred.

The output section 113 outputs, on the basis of event data output from the comparators 111 and 112, event data indicating the occurrence of an event having the positive polarity, event data indicating the occurrence of an event having the negative polarity, or event data indicating that no event has occurred to the transfer section 85.

For example, the output section 113 outputs, in a case where event data from the comparator 111 is the H level indicating 1, +V volts indicating +1, as event data indicating the occurrence of an event having the positive polarity, to the transfer section 85. Further, the output section 113 outputs, in a case where event data from the comparator 112 is the H level indicating 1, −V volts indicating −1, as event data indicating the occurrence of an event having the negative polarity, to the transfer section 85. In addition, the output section 113 outputs, in a case where each event data from the comparators 111 and 112 is the L level indicating 0, 0 volts (GND level) indicating 0, as event data indicating that no event has occurred, to the transfer section 85.

The transfer section 85 supplies a request to the arbiter 33 in the case where it is confirmed on the basis of event data from the output section 113 of the quantization section 84 that a change in light amount that is an event having the positive polarity or the negative polarity has occurred. After receiving a response indicating event data output permission, the transfer section 85 outputs event data indicating the occurrence of the event having the positive polarity or the negative polarity (+V volts indicating 1 or −V volts indicating −1) to the output section 35.

Preferably, the quantization section 84 has a configuration as illustrated in FIG. 9.

Figure 10:
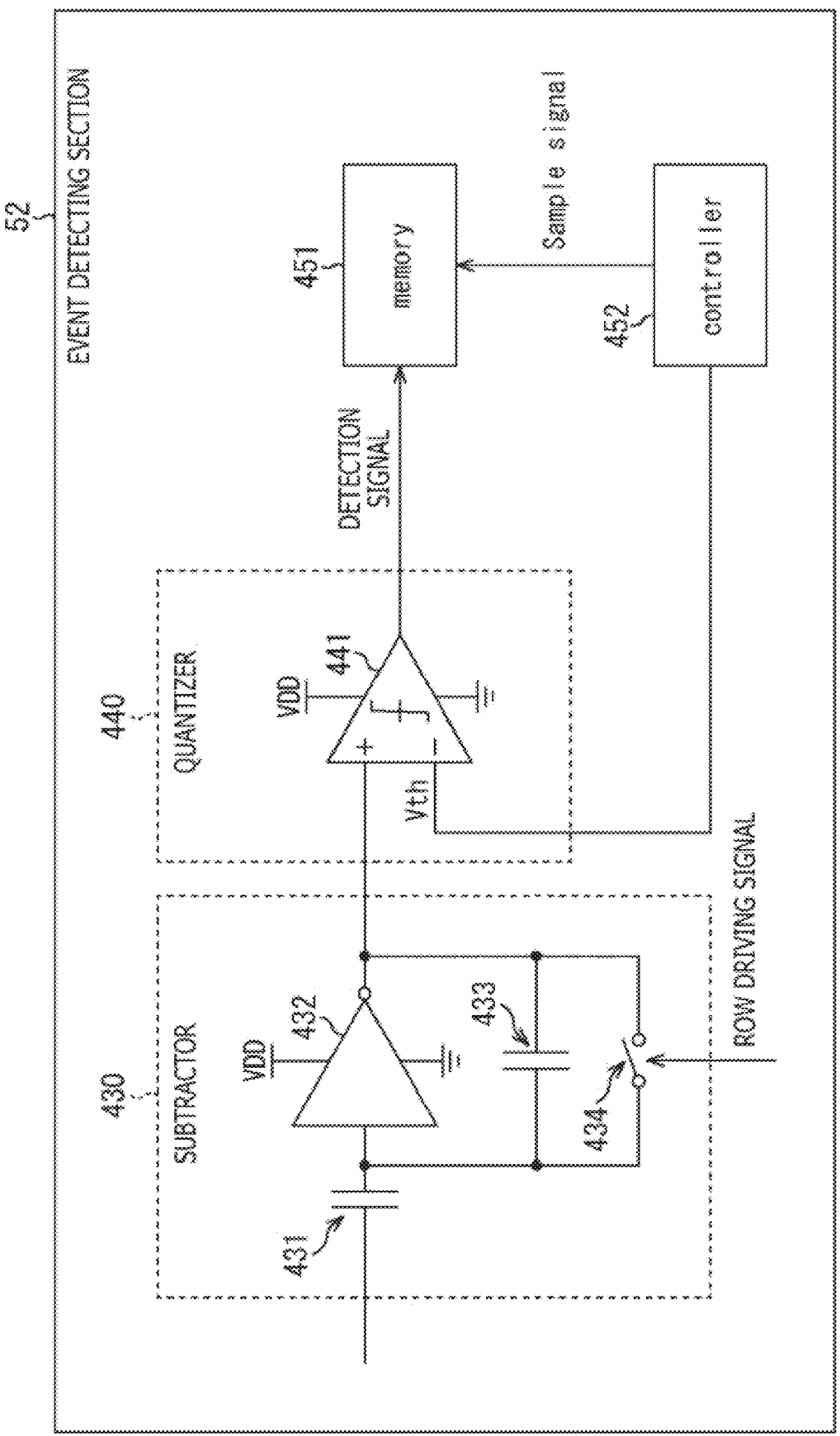
FIG. 10 is a schematic diagram of another event detecting section.

FIG. 10 is a diagram illustrating another configuration example of the event detecting section 52.

In FIG. 10, the event detecting section 52 includes a subtractor 430, a quantizer 440, a memory 451, and a controller 452. The subtractor 430 and the quantizer 440 correspond to the subtraction section 83 and the quantization section 84, respectively.

Note that, in FIG. 10, the event detecting section 52 further includes blocks corresponding to the current-voltage converting section 81 and the buffer 82, but the illustrations of the blocks are omitted in FIG. 10.

The subtractor 430 includes a capacitor 431, an operational amplifier 432, a capacitor 433, and a switch 434. The capacitor 431, the operational amplifier 432, the capacitor 433, and the switch 434 correspond to the capacitor 101, the operational amplifier 102, the capacitor 103, and the switch 104, respectively.

The quantizer 440 includes a comparator 441. The comparator 441 corresponds to the comparator 111.

The comparator 441 compares a voltage signal (difference signal) from the subtractor 430 with the predetermined threshold voltage Vth applied to the inverting input terminal (−). The comparator 441 outputs a signal indicating the comparison result, as a detection signal (quantized value).

The voltage signal from the subtractor 430 may be input to the input terminal (−) of the comparator 441, and the predetermined threshold voltage Vth may be input to the input terminal (+) of the comparator 441.

The controller 452 supplies the predetermined threshold voltage Vth applied to the inverting input terminal (−) of the comparator 441. The threshold voltage Vth which is supplied may be changed in a time-division manner. For example, the controller 452 supplies a threshold voltage Vth1 corresponding to ON events (for example, positive changes in photocurrent) and a threshold voltage Vth2 corresponding to OFF events (for example, negative changes in photocurrent) at different timings to allow the single comparator to detect a plurality of types of address events (events).

The memory 451 accumulates output from the comparator 441 on the basis of Sample signals supplied from the controller 452. The memory 451 may be a sampling circuit, such as a switch, plastic, or capacitor, or a digital memory circuit, such as a latch or flip-flop. For example, the memory 451 may hold, in a period in which the threshold voltage Vth2 corresponding to OFF events is supplied to the inverting input terminal (−) of the comparator 441, the result of comparison by the comparator 441 using the threshold voltage Vth1 corresponding to ON events. Note that, the memory 451 may be omitted, may be provided inside the pixel (pixel block 41), or may be provided outside the pixel.

Figure 11:
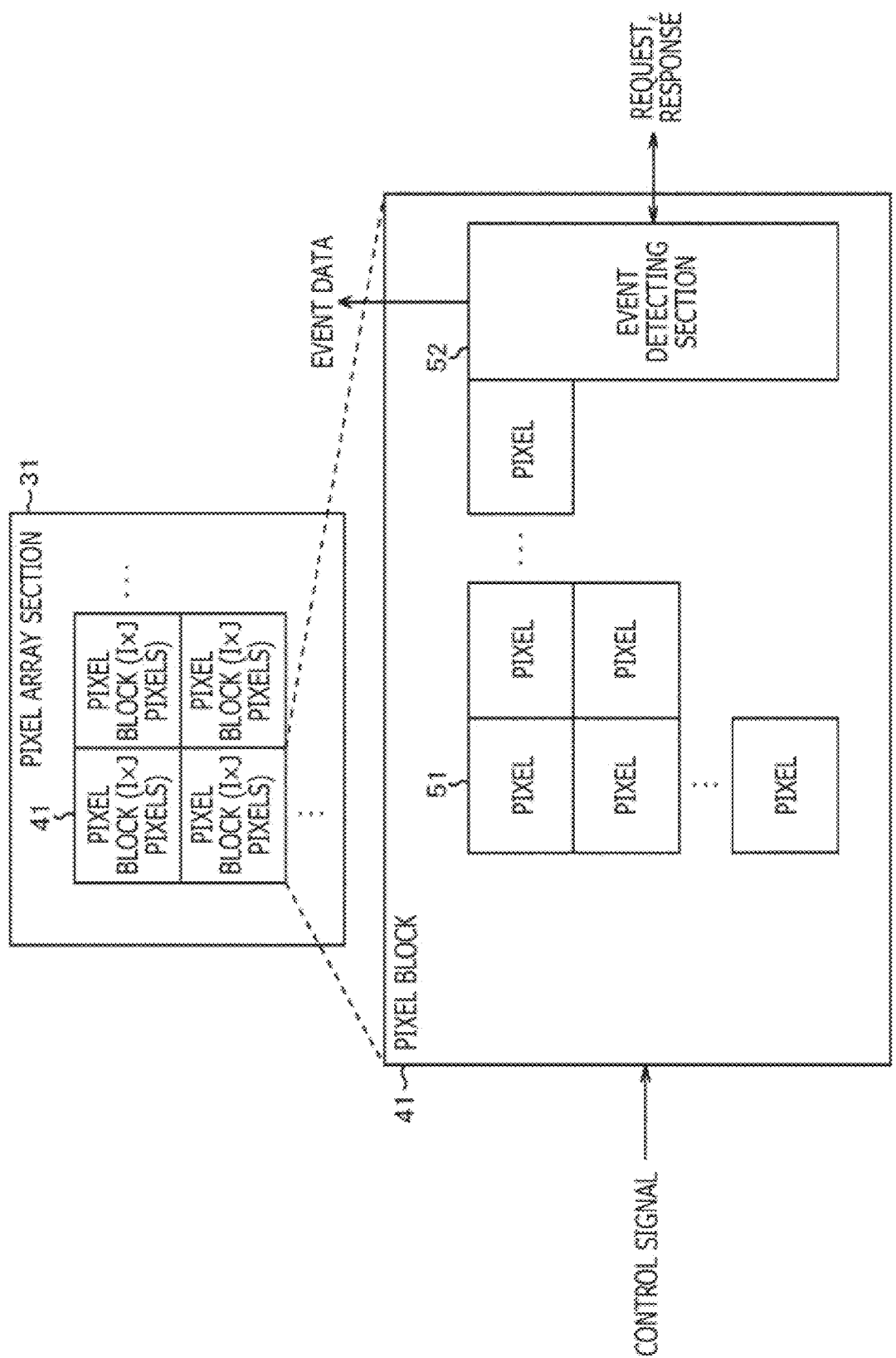
FIG. 11 is a schematic block diagram of another pixel array section.

FIG. 11 is a block diagram illustrating another configuration example of the pixel array section 31 of FIG. 2.

Note that, in FIG. 11, parts corresponding to those in the case of FIG. 3 are denoted by the same reference signs, and the description thereof is omitted as appropriate below.

In FIG. 11, the pixel array section 31 includes the plurality of pixel blocks 41. The pixel block 41 includes the I×J pixels 51 that are one or more pixels and the event detecting section 52.

Thus, the pixel array section 31 of FIG. 11 is similar to the case of FIG. 3 in that the pixel array section 31 includes the plurality of pixel blocks 41 and that the pixel block 41 includes one or more pixels 51 and the event detecting section 52. However, the pixel array section 31 of FIG. 11 is different from the case of FIG. 3 in that the pixel block 41 does not include the pixel signal generating section 53.

As described above, in the pixel array section 31 of FIG. 11, the pixel block 41 does not include the pixel signal generating section 53, so that the sensor section 21 (FIG. 2) can be formed without the AD conversion section 34.

Figure 12:
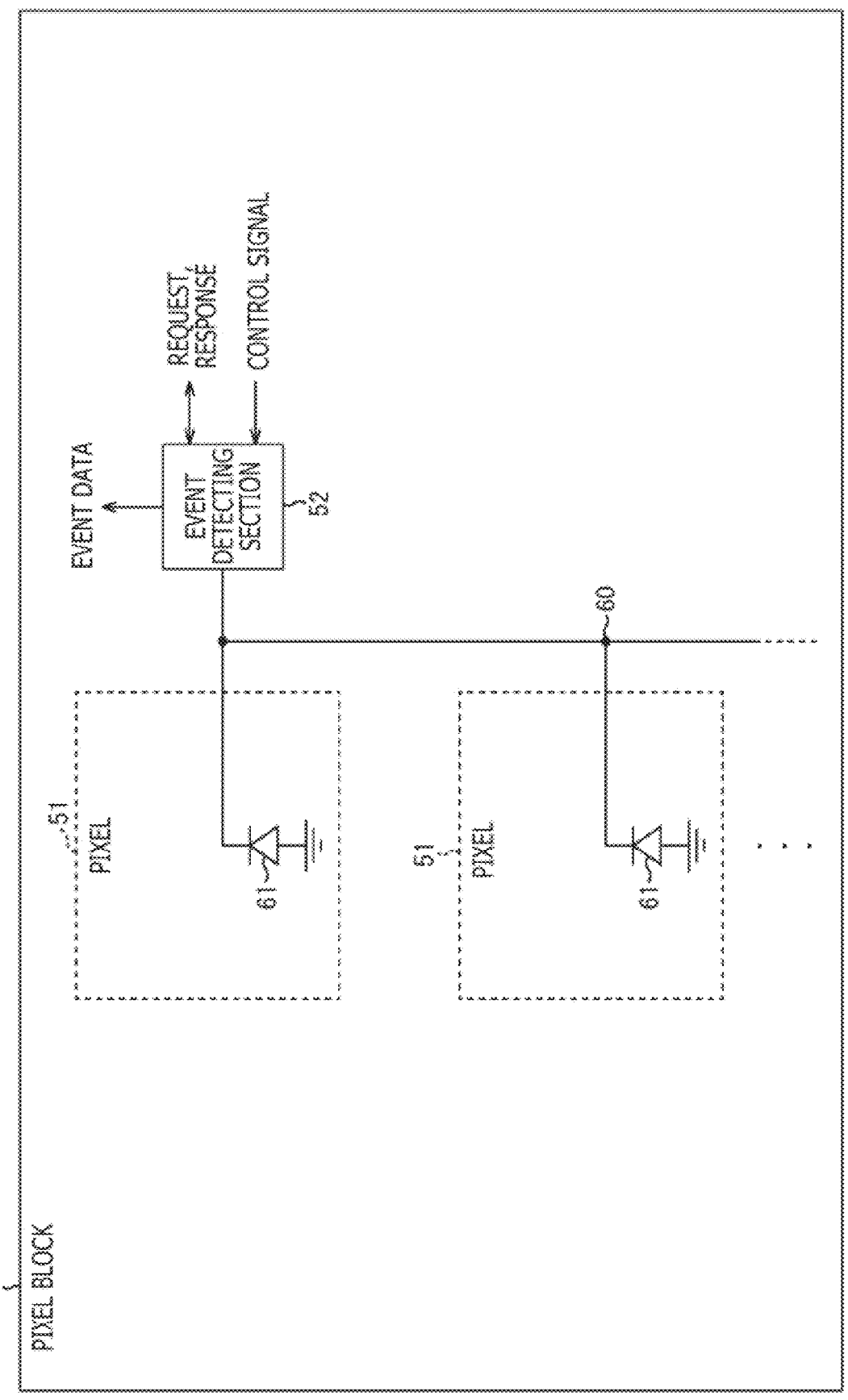
FIG. 12 is a schematic circuit diagram of another pixel block.

FIG. 12 is a circuit diagram illustrating a configuration example of the pixel block 41 of FIG. 11.

As described with reference to FIG. 11, the pixel block 41 includes the pixels 51 and the event detecting section 52, but does not include the pixel signal generating section 53.

In this case, the pixel 51 can only include the photoelectric conversion element 61 without the transfer transistors 62 and 63.

Note that, in the case where the pixel 51 has the configuration illustrated in FIG. 12, the event detecting section 52 can output a voltage corresponding to a photocurrent from the pixel 51, as a pixel signal.

Figure 13:
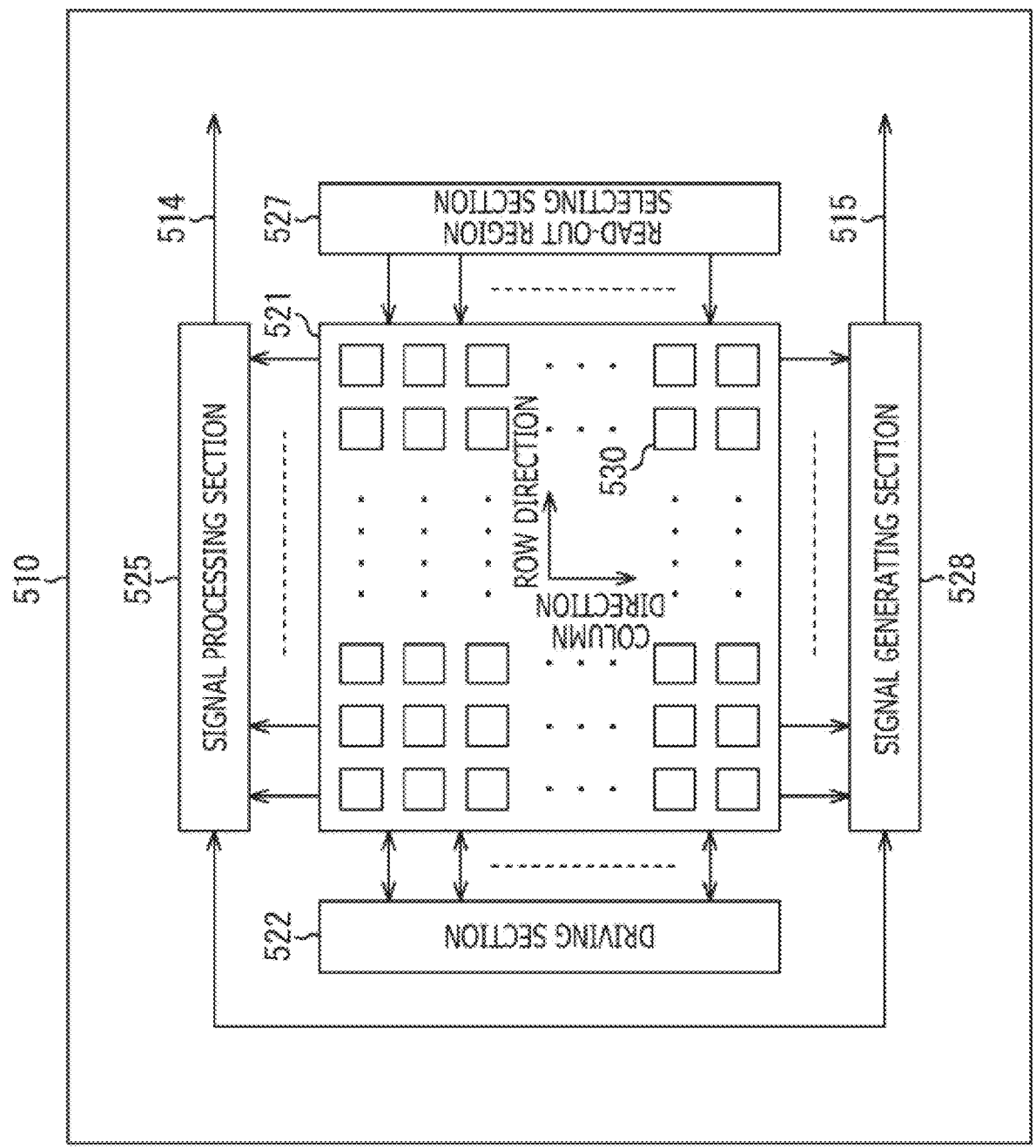
FIG. 13 is a schematic block diagram of a scan-type sensor device.

FIG. 13 is a block diagram illustrating a configuration example of a scan type imaging device which may be used as an EVS.

As illustrated in FIG. 13, an imaging device 510 includes a pixel array section 521, a driving section 522, a signal processing section 525, a read-out region selecting section 527, and an optional signal generating section 528.

The pixel array section 521 includes a plurality of pixels 530. The plurality of pixels 530 each output an output signal in response to a selection signal from the read-out region selecting section 527. The plurality of pixels 530 can each include an in-pixel quantizer as illustrated in FIG. 10, for example. The plurality of pixels 530 outputs output signals corresponding to the amounts of change in light intensity. The plurality of pixels 530 may be two-dimensionally disposed in a matrix as illustrated in FIG. 13.

The driving section 522 drives the plurality of pixels 530, so that the pixels 530 output pixel signals generated in the pixels 530 to the signal processing section 525 through an output line 514. Note that, the driving section 522 and the signal processing section 525 are circuit sections for acquiring grayscale information.

The read-out region selecting section 527 selects some of the plurality of pixels 530 included in the pixel array section 521. For example, the read-out region selecting section 527 selects one or a plurality of rows included in the two-dimensional matrix structure corresponding to the pixel array section 521. The read-out region selecting section 527 sequentially selects one or a plurality of rows on the basis of a cycle set in advance, e.g. based on a rolling shutter. Further, the read-out region selecting section 527 may determine a selection region on the basis of requests from the pixels 530 in the pixel array section 521.

The optional signal generating section 528 may generate, on the basis of output signals of the pixels 530 selected by the read-out region selecting section 527, event signals corresponding to active pixels in which events have been detected of the selected pixels 530. The events mean an event that the intensity of light changes. The active pixels mean the pixel 530 in which the amount of change in light intensity corresponding to an output signal exceeds or falls below a threshold set in advance. For example, the signal generating section 528 compares output signals from the pixels 530 with a reference signal, and detects, as an active pixel, a pixel that outputs an output signal larger or smaller than the reference signal.

The signal generating section 528 generates an event signal (event data) corresponding to the active pixel.

The signal generating section 528 can include, for example, a column selecting circuit configured to arbitrate signals input to the signal generating section 528. Further, the signal generating section 528 can output not only information regarding active pixels in which events have been detected, but also information regarding non-active pixels in which no event has been detected.

The signal generating section 528 outputs, through an output line 515, address information and timestamp information (for example, (X, Y, T)) regarding the active pixels in which the events have been detected. However, the data that is output from the signal generating section 528 may not only be the address information and the timestamp information, but also information in a frame format (for example, (0, 0, 1, 0, • • •).

In the following description reference will mainly be made to sensor devices of the EVS type as described above in order to ease the description and to cover an important application example. However, the principles explained below apply just as well to general imaging devices.

Figure 14:
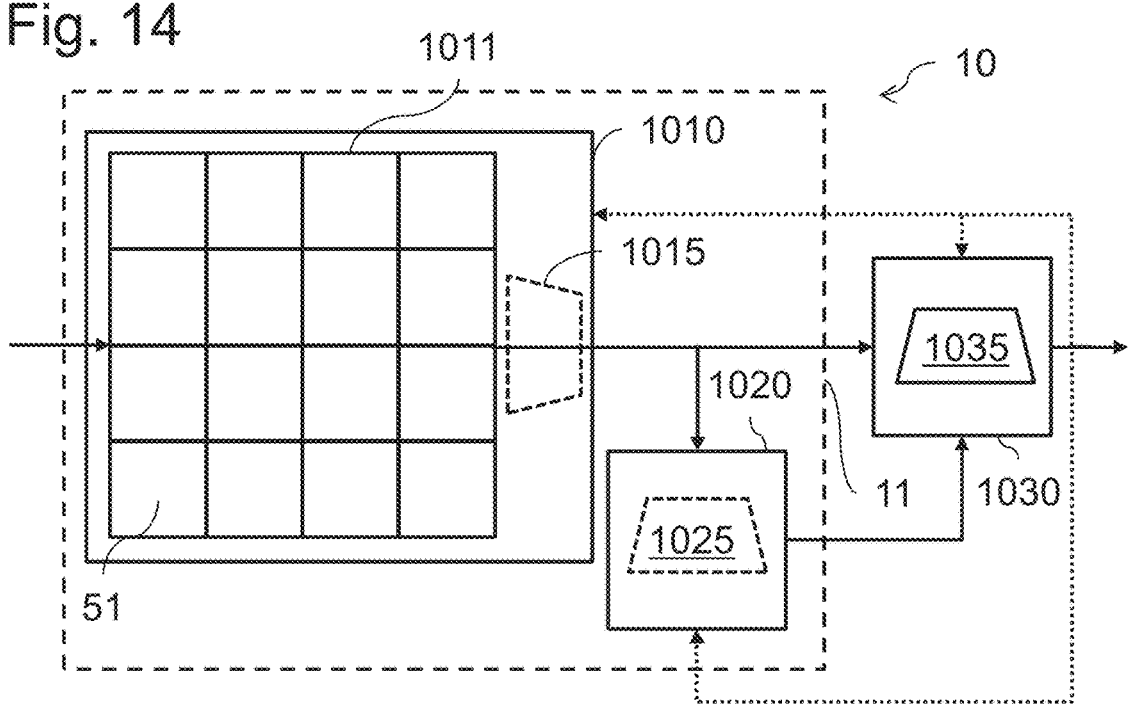
FIG. 14 is a schematic block diagram of a sensor device.

FIG. 14 shows a schematic illustration of a sensor device 10 that comprises a vision sensor 1010, a trigger unit 1020, and a processing unit 1030.

The vision sensor 1010 includes a pixel array 1011 that comprises a plurality of pixels 51 that are each configured to receive light and to perform photoelectric conversion to generate an electrical signal. The pixels 51 of the vision sensor 1010 may be standard imaging pixels that are configured to capture RGB or grayscale images of a scene on a frame basis. However, the pixels 51 may also be event detection pixels that are each configured to asynchronously generate event data based on the received light, which event data indicate as an event the occurrence of an intensity change of the light above an event detection threshold. Thus, the vision sensor 1010 may constitute an EVS as described above with respect to FIGS. 1 to 13. The pixel array 1011 may be formed solely of event detection pixels or may be a hybrid sensor array comprising a mixture of event detection pixels and pixels that generate an electrical signal that indicates the absolute intensity of the received light. Also, the pixels 51 of the pixel array 1010 may have the ability to generate both, event data and intensity data, as was described above with respect to FIGS. 3 and 4.

The vision sensor 1010 may comprise further components besides the pixel array 1011, based on which components a data stream is formed and output by the vision sensor 1010. For example, the vision sensor 1010 may comprise a classical digital signal processor that is configured to process the raw electrical signals provided by the pixels 51 in an in principle known manner. Alternatively or additionally, the vision sensor 1010 may comprise a machine learning module 1015 (termed third machine learning module 1015), preferably constituted by a neural network, that is configured to operate on the raw or pre-processed electrical signals provided by the pixels 51. The machine learning module 1015 may for example be used to extract features of the gathered electrical signals/data, which features can be advantageously used in later processing stages. However, processing of the raw image data by the machine learning module 1015 may also have purposes that are unrelated to the later processing stages, or pre-processing by a machine learning algorithms may not be carried out within the vision sensor 1010.

Examples of machine learning algorithms that operate on event data are e.g. given in "Event-based Asynchronous Sparse Convolutional Networks" by Messikommer et al., "Unsupervised Feature Learning for Event Data: Direct vs Inverse Problem Formulation" by Kostadinov and Scaramuzza, "AEGNN: Asynchronous Event-based Graph Neural Networks" by Schaefer et al., "Event Transformer" by Li et al., and "Recurrent Vision Transformers for Object Detection with Event Cameras" by Gehrig and Scaramuzza, the content of which is incorporated herein by reference. These or similar algorithms might be used in the machine learning module 1015 of the vision sensor 1010.

The trigger unit 1020 of the sensor device 10 is configured to receive portions of the data stream and to generate trigger signals based on said portions of the data stream. That is, parts of the data stream are processed by the trigger unit 1020 in order to infer whether a trigger signal is to be set or not. The trigger signal indicates whether the portion of the data stream analyzed by the trigger unit 1020 should be forwarded to further processing stages or should be discarded. The trigger unit 1020 may also receive feedback from the processing unit 1030.

Here, the portions of the data stream could be a temporal and/or spatial selection out of data of the data stream. For example, for an event data stream event frames might be generated as exemplarily described with respect to FIG. 8, which event frames constitute the portions of the data steam. Just the same, image frames of a conventional camera can be considered as portions of an image data stream. The data stream may also be divided spatially such that specific parts of an (event or image) frame constitute portions of the data stream. However, data portions are not necessarily continuous in space and time and may be arbitrarily selected from the data available for a given time period, if this proofs to be advantageous. The portioning of the data stream may for example be executed by the machine learning module 1015 of the vision sensor 1010.

To decide which portions of the data stream to process further, the trigger unit 1020 may recognize that portions of the data stream contain only information that is redundant to information that was already forwarded for further processing and may also use feedback from the processing unit 1030. No further processing will then be triggered for such redundant portions. Additionally or alternatively, the trigger unit 1020 may be able to classify contents of the data stream and trigger processing of the data stream only for a specific class of contents. For example, only data related to the observation of a particular scene, e.g. a highway or a city environment, may be further processed. To this end, also the trigger unit 1020 may use a machine learning module 1025 (termed second machine learning module 1025), which is different from the machine learning module 1015 of the vision sensor 1010. The machine learning module 1025 of the trigger unit 1020 may in principle be an arbitrary machine learning algorithm that is capable to carry out the functions of the trigger unit 1020 described below. In particular, a neural network having an in principle known structure might be used that carries out the functions of the trigger unit 1020.

The trigger unit 1020 provides the trigger signal(s) to the processing unit 1030. The processing unit 1030 is configured to carry out a predetermined processing on the data stream by using a machine learning module 1035 (termed first machine learning module 1035). The predetermined processing might be any task that can be commonly applied to data of an imaging sensor, like e.g. image generation, image classification, classification of movements, object classification, and image segmentation.

That is, in principle the data stream is forwarded to the processing unit 1030 for further processing. The processing unit 1030 may carry out any kind of predetermined operation, although of particular interest are operations in the field of image processing. For example, the processing unit 1030 may operate on pixel signals/the data stream to generate an image that is free of imaging artifacts like noise or inter-pixel mismatch of the pixel array 1011 or handshake during image acquisition. The processing unit 1030 may compensate such effects. Additionally or alternatively, the processing unit 1030 may also operate on the data stream without generating an image (or without generating an image that is appealing for a human observer). For example, the processing unit 1030 may execute classification tasks. It may classify the pixel signals/the data stream according to the observed scenes (e.g. country sides, city) or may classify objects (e.g. persons, cars, roadsides) or movements (e.g. hand gestures, approaching objects) within the observed scenes. Further, the processing unit 1030 may also segment observed scenes (e.g. healthy tissue—pathological tissue, road—curb). All these tasks or types of predetermined processing can be executed by a machine learning module, preferably by a neural network, that has been designed in an in principle known manner for the task at hand.

However, the processing unit 1030 will carry out the predetermined processing only for those portions of the data stream for which the trigger signal indicates that processing is allowed and then it can also send a feedback signal back to the vision sensor 1010 and/or to the trigger unit 1020. For example, the processing unit 1030 may continuously receive the data stream from the vision senor 1010 and may continuously receive trigger signals from the trigger unit 1020 that refer to different portions of the data stream. The trigger signals may comprise a single bit indicating e.g. with "1" that the predetermined processing is to be carried out and with "0" that the predetermined processing is forbidden, and a pointer to the corresponding portion of the data stream. The processing unit 1030 will then discard those portions of the data stream that have an according trigger signal (e.g. a "0" bit/flag) and process only the other portions (e.g. marked with a "1" bit/flag) and/or sends a feedback signal back to the vision sensor 1010 or/and to the trigger unit 1020.

Alternatively, the trigger unit 1020 will receive also the data stream, and optionally feedback from the processing unit 1030, and will forward only those portions of the data stream to the processing unit 1030 for which processing is found to be allowed, while the other portions are discarded. Just the same, the trigger unit 1020 may provide the trigger signal also to the vision sensor 1010 such as to prohibit forwarding of portions to the processing unit 1030 whose processing is not allowed. Thus, the trigger unit 1020 may be configured to prohibit transfer of the portion of the data stream to the processing unit 1030, if the respective trigger signal indicates that the predetermined processing is not allowed for said portion of the data stream In this manner it is possible to filter redundant and/or unnecessary data from the data stream before the predetermined processing is applied to the data stream. This helps to reduce the data to be processed to essential data, which leads to a reduction of the processing complexity, the processing time, and the energy consumed by the processing.

In the sensor device 1010 possibly three machine learning modules are implemented. The first machine learning module 1035 of the processing unit 1030, the second machine learning module 1025 of the trigger unit 1020 and the third machine learning module 1015 of the vision sensor 1010. From these at least one of the second and third machine learning modules 1015, 1025 can be used to bring the data of the vision sensor 1010, i.e. the pixel signals of the pixel array 1011 into a shape that is optimal for deciding whether or not to carry out the predetermined processing. Either the trigger unit 1020 intelligently analyzes the data stream such as to filter out the data portions of most relevance by setting according trigger signals, or the vision sensor 1010 provides data already in a form that makes a decision by the trigger unit 1020 straightforward. Of course, also both, the second and the third machine learning modules may be present to support each other's functions and can use feedback signal from the processing unit 1030.

In any case, the efficiency of the predetermined processing can be enhanced by using the first machine learning module 1035 together with at least one of the second and third machine learning modules 1015, 1025. Whether the efficiency is truly enhanced will depend on the capability of the trigger unit 1020 to correctly set trigger signals for the relevant portions of the data stream. This again depends on the particular task, i.e. the particular predetermined processing to be carried out by the processing unit.

Thus, to improve the efficiency of the predetermined processing the first machine learning module 1035 is trained such as to optimize the predetermined processing together with the second machine learning module 1025 used by the trigger unit 1020 to generate the trigger signals and/or the third machine learning module 1015 used by the vision sensor 1010 to generate the data stream. In particular, by training the machine learning modules together it can be ensured that the parameters of the second/third machine learning modules are adjusted such that "ON"-triggers are always set for portions of the data stream that will allow the processing unit 1030/the third machine learning module 1035 to give a correct estimate for the task at hand and/or send feedback signal back to the trigger unit 1020 and/or the vision sensor 1010. The common training of the machine learning modules 1015, 1025, 1035 serves therefore the purpose to allow an implicit training of the upstream machine learning modules 1015, 1025 such as to optimize these modules such as to allow an optimization of the downstream first machine learning module 1035 that would not be possible for separately trained machine learning modules 1015, 1025 of the vision sensor 1010 and/or the trigger unit 1020. Here, also feedback from the processing unit 1030 may be used as a feature that can be used by the machine learning modules 1015, 1025 of the vision sensor 1010 and/or the trigger unit 1020.

Particular training scenarios will be described in the following with respect to a combination of the first and second machine learning modules 1035, 1025, i.e. of the machine learning modules of the processing unit 1030 and the trigger unit 1020, respectively. The below description generalizes in a straightforward manner to the inclusion of the third machine learning module 1015 of the vision sensor 1010 as well as to the inclusion of further machine learning modules. The description is restricted to two modules only to simplify the description, but not to limit the present disclosure. Moreover, in the following it can be assumed that the machine learning modules are constituted by neural networks.

The machine learning modules may be trained according to two variants. Either, the models are pre-trained during a simulation stage, i.e. a stage were the operation of the sensor device 10 is simulated based on a training data set that contains a plurality of videos representing observable scenes. Based on these videos outputs of the vision sensor are simulated which are used to simulate the performance of the first and second machine learning modules 1035, 1025. The performance of the machine learning modules 1025, 1035 is optimized and the parameters of the optimized models are fixedly stored in the trigger unit 1020 and the processing unit 1030.

Or, the models are trained based on a continual learning algorithm. Then, each newly observed scene will lead to a re-evaluation of the machine learning modules 1025, 1035 that might lead to an adaption of the parameters of the modules.

Further, supervised and un-supervised learning may be used for the training, where supervised learning is preferably used in the pre-training variant, while un-supervised learning might be applied in both variants.

Feedback paths from the output of the processing unit that are used during the training process are illustrated with broken lines in FIG. 14. However, it should be noted that these feedback paths only represent the conceptual flow of information but not necessarily the actual transfer of data. The feedback path may be used to transfer back to the vision sensor 1010 or the trigger unit 1020 a feature (a scalar or a vector) representation and the vision sensor 1010 or the trigger unit 1020 can take this as a context.

In the pre-training setup, a joint learning objective or loss function can be defined for both machine learning modules:

$$L = \lambda_{TR} L_{TR} + \lambda_P L_P$$

by adding a loss function $L_{TR}$ for the machine learning module 1025 of the trigger unit 1020 and a loss function $L_P$ for the machine learning module 1035 of the processing unit 1030 which are weighted with tunable parameters $\lambda_{TR}$ and $\lambda_P$. The parameters of the corresponding neural networks can then be optimized by using backpropagation, preferably with gradient descent or more preferably with stochastic gradient descent as e.g. described in "Deep Learning, volume 1" by Goodfellow et al. (MIT Press, 2016), the content of which his hereby incorporated by reference.

Training labels, i.e. desired estimations of the predetermined processing, may be only provided for the combined task, i.e. for the output of the first machine learning module 1035, while labels for the loss function of the second machine learning module can be deduced therefrom. For example, the labels for the second machine learning module can be assigned manually according to the ideal trigger behavior.

Moreover, also other criteria could be used to explicitly define the trigger loss $L_{TR}$. However, by back propagating the entire/combined loss L over the combined neural network it will be possible to optimize the network even without using exact expression for $L_{TR}$ and $L_P$.

Alternatively, the task objectives for the first and second machine learning modules 1035, 1025 may be decoupled, i.e. labels for each training task may be set without being explicitly tied.

In the supervised, pre-training setup the loss function $L_P$ for the first machine learning module 1035 may be cross entropy loss and the loss function $L_{TR}$ for the second machine learning module 1025 may be cross entropy loss or connectionist temporal classification, CTC, loss. However, any other loss functions may be used that can efficiently help to optimize the predetermined processing.

In a continual learning setup the same principle formula for the total loss function can be used. In this case backpropagation as used in the pre-training setup may be combined with experience repay as e.g. explained in "Learning and Categorization in Modular Neural Networks" by Murre or other methods that avoid catastrophic forgetting and writing of neural network parameters as e.g. described in "Catastrophic Forgetting in Connectionist Networks" by French, which documents are both incorporated by reference herein. Of course, any other well-known continual learning algorithm may be used.

In the self-supervised/unsupervised learning case there will be no labels for the task at hand, i.e. for the output of the predetermined processing. Nevertheless, it is possible to define labels for the trigger loss $L_{TR}$ using the loss $L_P$ of the first machine learning module 1035. Again, low loss values can be mapped to an "ON" trigger label, and high loss values to "OFF" trigger labels. Here, the loss function $L_P$ of the first machine learning module 1035 may be mean square error loss or contrastive loss (see e.g. "A Simple Framework for Contrastive Learning of Visual Representations" by Chen, which is incorporated by reference herein) and the loss function $L_{TR}$ of the second machine learning module 1025 may be cross entropy loss (see e.g. "Deep Learning, volume 1" by Goodfellow et al, which is incorporated by reference herein).

In this manner, in principle known ways of training neural networks/machine learning modules can be combined to provide an improved combination of neural networks that increases the efficiency with which tasks in image processing can be executed.

In the above description the processing unit 1030 may be constituted by a commonly known device and may for example be a computer, a processor, a CPU, a GPU, circuitry, software, a program or application running on a processor and the like. Moreover, the computational functions of the trigger unit 1020 and the vision sensor 1010 may also be carried out by any known device such a processor, a CPU, a GPU, circuitry, software, a program or application on a processor and the like. Thus, the nature of the computing devices executing the functions of the vision sensor 1010, the trigger unit 1020 and the processing unit 1030 are arbitrary, as long as they are configured to carry out the functions described herein.

As illustrated in FIG. 14 the vision sensor 1010 and the trigger unit 1020 may be formed on the same sensor chip 11, while the processing unit 1030 is on a separate chip/die/substrate or part of an external device. However, the trigger unit 1020 may also be part of the chip carrying the processing unit 1030. Moreover, vision sensor 1010, trigger unit 1020 and processing unit 1030 may be arranged on the same chip or may each be located on different chips.

Figure 15:
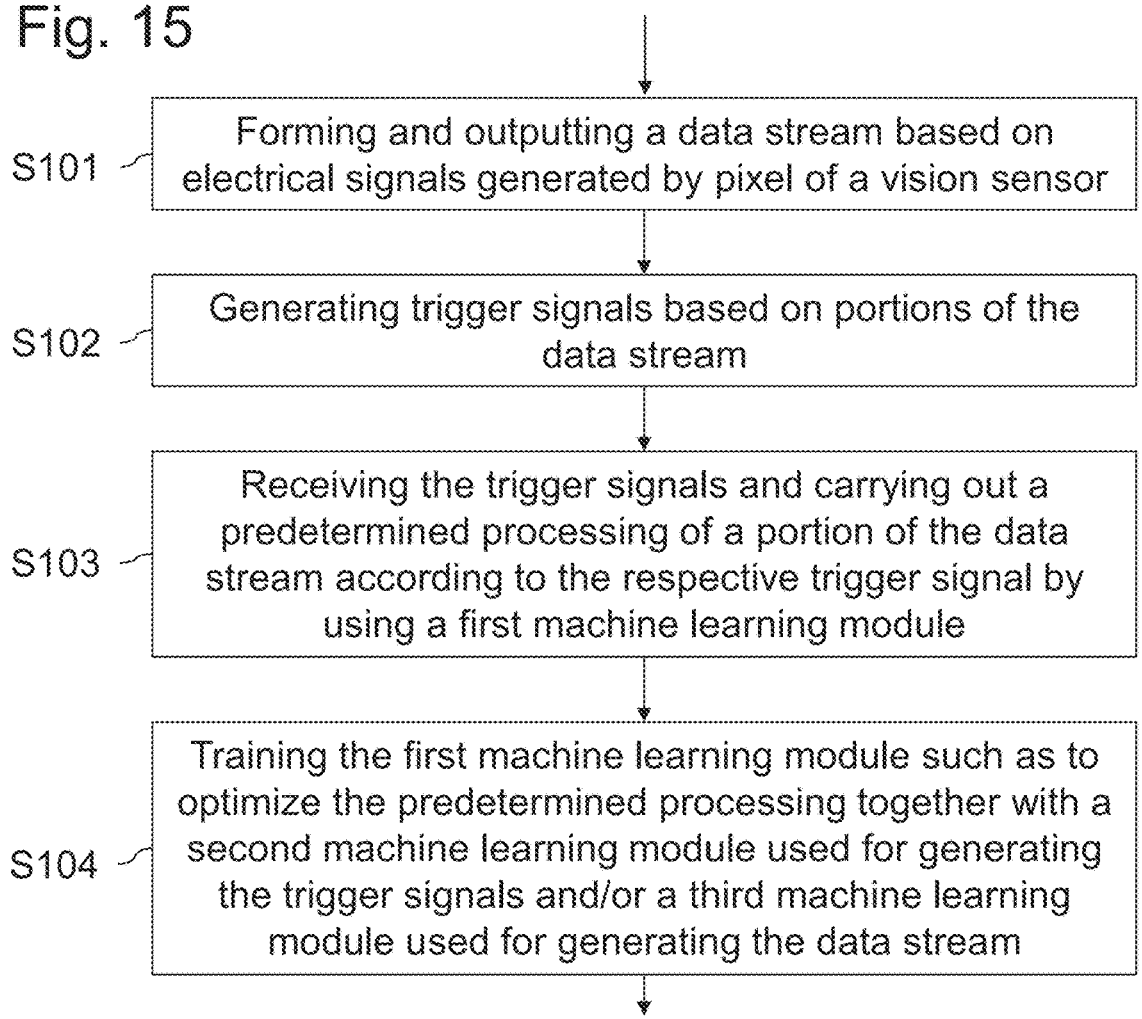
FIG. 15 is a schematic illustration of a process flow of a method for operating a sensor device.

The above-described method for operating a sensor device is summarized again in FIG. 15. At S101, by a vision sensor 1010 that comprises a pixel array 1011 having a plurality of pixels 51 each being configured to receive light and to perform photoelectric conversion to generate an electrical signal, a data stream is formed and output based on the generated electrical signals.

At S102 portions of the data stream are received by a trigger unit 1020 which generates trigger signals based on said portions of the data stream. The trigger signals may also be based on a feedback signal from the processing unit 1030 that are used as a context or conditioning.

At S103 the trigger signals are received by a processing unit 1040 that carries out a predetermined processing of a portion of the data stream for which the predetermined processing was indicated to be allowed by the respective trigger signal by using a first machine learning module 1035.

At S104 the first machine learning module 1035 is trained such as to optimize the predetermined processing together with a second machine learning module 1025 used for generating the trigger signals and/or a third machine learning module 1015 used for generating the data stream. The training may be done with or without a feedback signal from the processing unit 1030, as a context, or conditional encoding, or for conditional trigger generation.

Here, it should be noted that although FIG. 15 shows different steps that follow each other subsequently, this order is not necessarily fixed. In particular, training of the first machine learning module 135 may precede the formation and output of the data stream in a pre-training setup or may run concurrent with the predetermined processing.

In the above description it was assumed that the data output by the vision sensor 1010 are processed by the processing unit 1030 if this is indicated to be allowed by a respective trigger signal. However, the data from the vision sensor 1010 may also be encoded before they are provided to the processing unit 1030.

Figure 16:
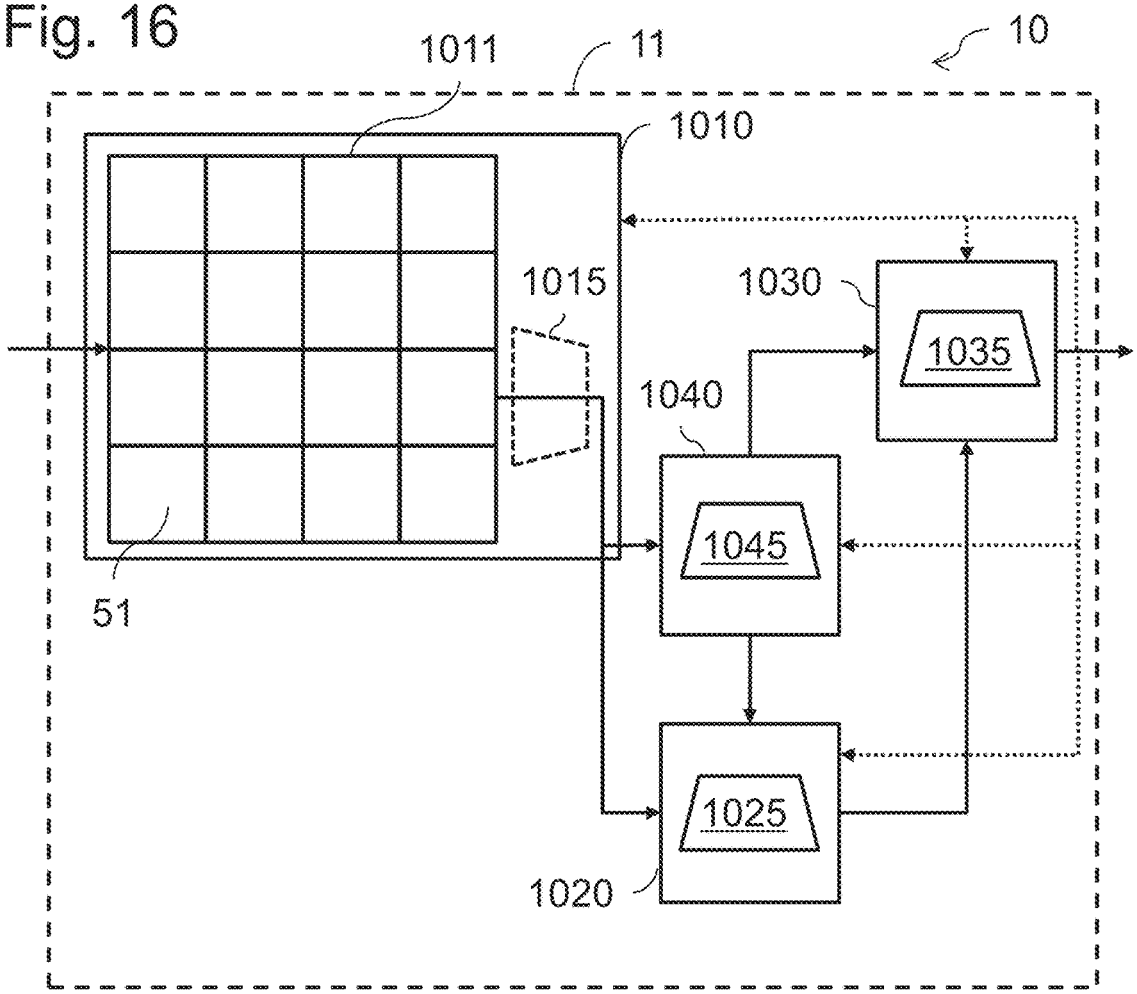
FIG. 16 is a schematic block diagram of another sensor device.

In particular, as illustrated in FIG. 16, the sensor device may comprise an encoding unit 1040 that is configured to encode portions of the data stream based on a fourth machine learning module 1045. Here, feedback from the processing unit 1030 may be provided to the encoding unit 1040 as a feature for context based conditioning. Then, the trigger unit 1020 is configured to generate the trigger signals based on the encoded portions of the data stream (and optionally feedback signals from the processing unit 1030) based on the second machine learning module 1025, and at least the first machine learning module 1035, the second machine learning module 1025, and the fourth machine learning module 1045 are trained together to optimize the predetermined processing carried out by the processing unit 1030. According to this setup the processing unit 1030 as well as the trigger unit 1020 are only provided with encoded data. The trigger unit 1020 may either prohibit processing of encoded data portions by the respective trigger signals or may interrupt forwarding of such encoded data from the encoding unit 1040 to the processing unit 1030.

Thus, instead of using the mere data stream the encoding unit 1040 orders, selects, and/or transforms the data such as to obtain representations that can be most easily processed by the trigger unit 1020 and the processing unit 1030. For example, the encoding unit 1040 may encode an event stream into a vector format, i.e. a linear series of numbers. A most simple example of such a vector format might be to indicate for each pixel 51 and for each time instance occurrence of an event with 1 and non-occurrence of an event with 0. Instead of 1 for event occurrence, 1 may also indicate positive polarity events and −1 may indicate negative polarity events. Although this representation is rather simple, it will generate huge vectors that might be difficult to handle. Moreover, this representation might not be optimal for processing the event stream. A condensed representation may for example only count the number of events per event detection pixels in a given time interval or may cluster events even differently. Also, a principle component analysis of the event data may be performed as encoding. Moreover, encoding schemes that lead to the best classification results might not be obvious for a human observer and might only be retrievable by the fourth machine learning module 1045. For example, a variational auto encoder might be used as the fourth machine learning module 1045. The encoding unit 1040 may optionally also use feedback signals from the processing unit 1030 for context conditioning.

Although the encoding unit 1040 is shown as separate component in FIG. 16, it may also be part of the vision sensor 1010. For example, encoding could be carried out by the third machine learning module 1015 of the vision sensor 1010 based on the outputs of the third machine learning module 1015 or instead of it. In this manner the sensor device 1010 may be more compact as compared to the case where the encoding unit 1040 is separately formed on the sensor chip 11.

In FIG. 16 all components of the sensor device 10 are shown to be on the same sensor chip 11. As stated above, this must not be understood to be limiting. All components of the sensor device 10 may reside on their own chips/dies/substrates or may be arbitrarily grouped together.

In the above description, the second machine learning module 1025 and/or the fourth machine learning module 1045 may be recurrent neural networks, RNNs, or long short-term memory, LSTM, networks. Thus, these machine learning modules may be considered neural networks with a memory unit that allow to operate on single events. Due to the capability to store information for several time steps, such networks are able to understand the temporal correlation between different events. Nevertheless, they can work with the high temporal resolution of single events in the order of microseconds. On the other hand, also neural networks without memory units might be used. Although such networks are simpler, data have to be pre-processed, if temporal structure are to be observable by them. In particular, events need to be accumulated/integrated, for example into event frames, if neural networks without memory units are to be used.

Figure 17:
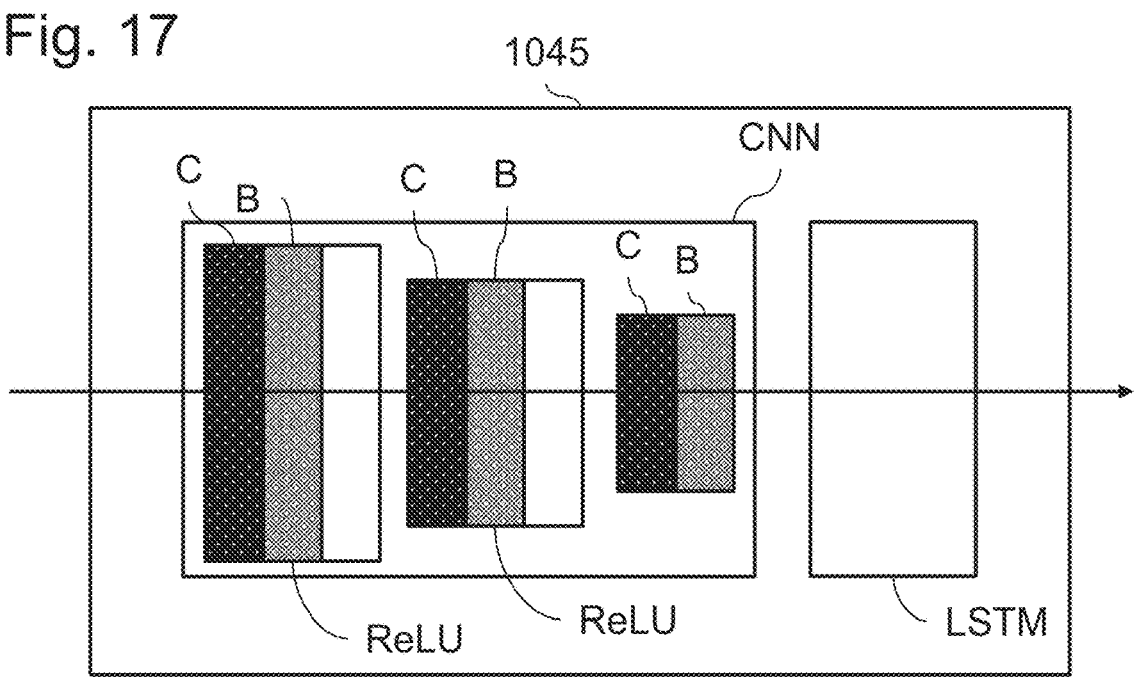
FIG. 17 is a schematic illustration of a machine learning module of an encoder.

A possible implementation of the fourth machine learning module 1045 of the encoding unit 1040 is schematically illustrated in FIG. 17. The fourth machine learning module 1045 consists of a convolutional neural network, CNN, and a standard LSTM network. The CNN comprises several convolutional layers C, batch normalization layers B, and rectified linear unit, ReLU, layers. In this case a neural network comprising a fully connected neural network layer may be used at the trigger unit 1020 and/or the processing unit 1030. Also, a decoding unit mirroring the CNN of the encoding unit may be provided as first machine learning module 1035 in the processing unit 1030.

The feedback paths that are shown with broken lines in FIGS. 14 and 16 may also be used to provide feedback signals from the processing unit 1030 to the vision sensor 1010 and the trigger unit 1020. In particular, the system, e.g. in the vision sensor 1010 (or the third machine learning module 1015) may continually preserve data from the environment and using the state of a feedback signal, i.e. an indication regarding the outcome of the task at hand, it updates a latent representation. This latent representation is then sent together with the data to the trigger unit 1020 (and optionally also to the encoding unit 1040). The trigger unit 1020 uses this latent representation and the state of the feedback signal to determine whether or not to set a trigger, i.e. whether or not to allow data processing by the processing unit 1030. When the trigger is active the latent representation gets also sent to the processing unit 1030 and the processing continues there. The following new inference made by the processing unit 1030, i.e. the new estimate for the considered task, results in a new feedback signal that is sent from the processing unit 1030 the vision sensor 1010 and the trigger unit 1020, where it causes an update of the state of the feedback signal and hence an update of the corresponding latent representation. In this manner, a feedback loop is not only used to train the system, but also to actively influence the trigger process. This can further improve the speed and the quality/reliability of the executed task.

As explained above, pre-processing of the pixel signals provided by the pixels 51 may be necessary in particular for event detection pixels. In the following, possible manners of ordering and dividing the incoming event stream will be discussed. This ordering is typically done within the vision sensor 1010 and may or may not be carried out by using the third machine learning module 1015.

The basis for all the ordering schemes discussed below is the grouping of events into event frames F, as discussed above with respect to FIG. 8. In this example, temporal planes are defined that indicate the end and the beginning of one event frame, and events lying between these planes are used to generate pixel values of the event frame, e.g. by adding 1 for a positive polarity event in a pixel 51 and −1 for a negative polarity event. However, event frames might also be generated differently. For example, positive and negative event values may be projected in a weighted manner to temporal planes defining the position of the event frames, where weights depend on the temporal distance to the respective plane. Pixel values are then obtained by adding all weights obtained for one pixel.

Figure 18:
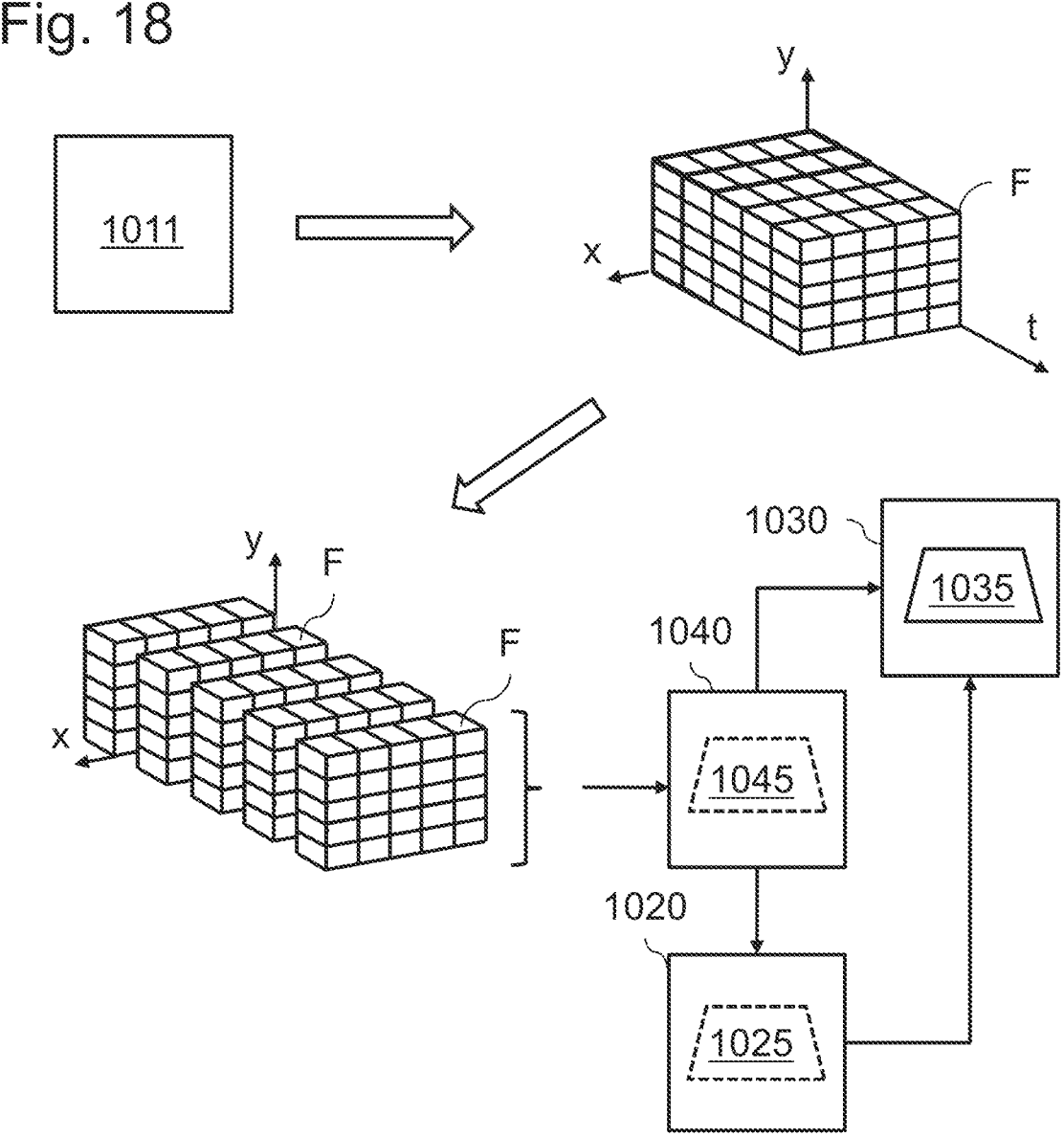
FIG. 18 is a schematic illustration of a processing of event data.

FIG. 18 shows schematically this separation of the event stream generated by the pixel array 1011 into event frames F. As shown in FIG. 18 the event stream extends two-dimensionally across the coordinates of the pixel array 1011 (x and y coordinates). The event stream is sliced in the time direction t. Single event frames F constitute portions of the event stream that are input into the trigger unit 1020 and the processing unit 1030, preferably but not necessarily via the encoding unit 1045. Additionally, the trigger unit 1020 and/or the vision sensor 1010/the encoding unit 1040 receive features in the form of feedback signals from the processing unit 1030. The trigger unit 1020 sets one trigger signal per event frame F and decides in this manner whether or not processing of the event frame F is allowed in the processing unit 1030. If the processing is allowed the processing unit 1030 will update its estimate for the given task. If not, the output of the processing unit 1030 will remain fixed or there will be no output at all.

In this manner, event frames F can be used as a simple manner of ordering the event stream generated by the pixel array 1011 such as to allow meaningful and resource-efficient processing of the event data.

Figure 19:
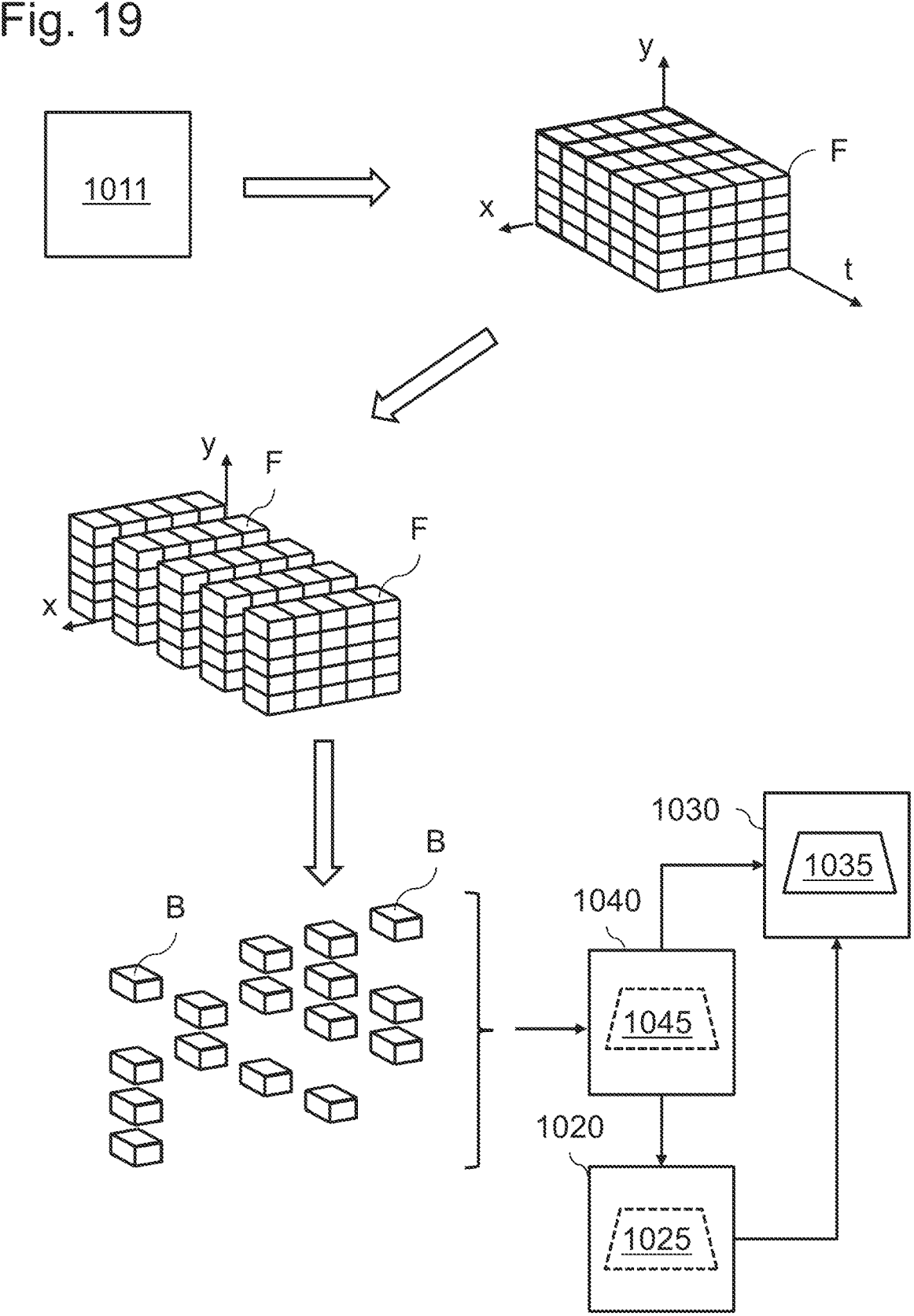
FIG. 19 is a schematic illustration of another processing of event data.

A further variant of this approach is shown in FIG. 19. Here, the vision sensor 1010 is configured to accumulate the events into event frames F having a predetermined temporal length as explained above with respect to FIG. 18. Afterwards, the vision sensor 1010 splits the event frames F spatially into event blocks B, wherein each event block B constitutes a portion of the data stream formed and output by the vision sensor 1010.

However, not all event blocks B generated in this manner will contain events (or a number of events above a given threshold). Then, those event blocks B that do not contain events will be discarded. This is schematically shown in the lower left side of FIG. 19, where only some of the event blocks B of one event frame F are maintained.

The encoding unit 1040 is configured to jointly encode all the event blocks B of one event frame F that contain events and provides this joint encoding to the trigger unit 1020 and the processing unit 1030. Alternatively, the trigger unit 1020 and the processing unit 1030 will merely receive the non-empty event blocks B and operate with their machine learning modules on these event blocks B. In this manner, the number of blocks, i.e. the amount of data, which has to be processed by the various units of the sensor device 10 can be reduced in a simple manner. Further, if only a number of event blocks B below a given threshold is non-empty, it may be decided to not process the corresponding event frame F at all. Providing event blocks B enhances therefore the computation efficiency additionally. Encoding unit 1040 and trigger unit 1020 may also operate based on feedback from the processing unit 1030.

Preferably, the encoding unit 1040 is configured to generate a plurality of tokens from the event blocks B during the encoding with the fourth machine learning module 1045, which tokens may represent specific sequences of events. This may be done by transferring algorithms of token representation, in particular transformer architectures/transformer-like neural network architectures, from natural language processing to image/event processing. This is in principle known and will therefore not be described in further detail, see for example "An Image is Worth 16×16 Words: Transformers for Image Recognition at Scale" by Dosovitskiy et al. which is incorporated by reference herein).

The trigger unit 1020 is then configured to generate one trigger signal for one event frame F based on at least one of the tokens generated for this event frame F (and optionally based on feedback from the processing unit 1030). In particular, the encoding unit 1040 may generate or identify one or several trigger tokens, the presence of which means that processing is allowed. All remaining tokens, i.e. all feature tokens are forwarded to the first machine learning module 1035, which may be or comprise a fully connected neural network layer in this case.

By using tokens, redundant information in the event blocks B can be further reduced, since such redundant information will lead to the same (or similar) token. This further improves the efficiency of the processing.

Figure 20:
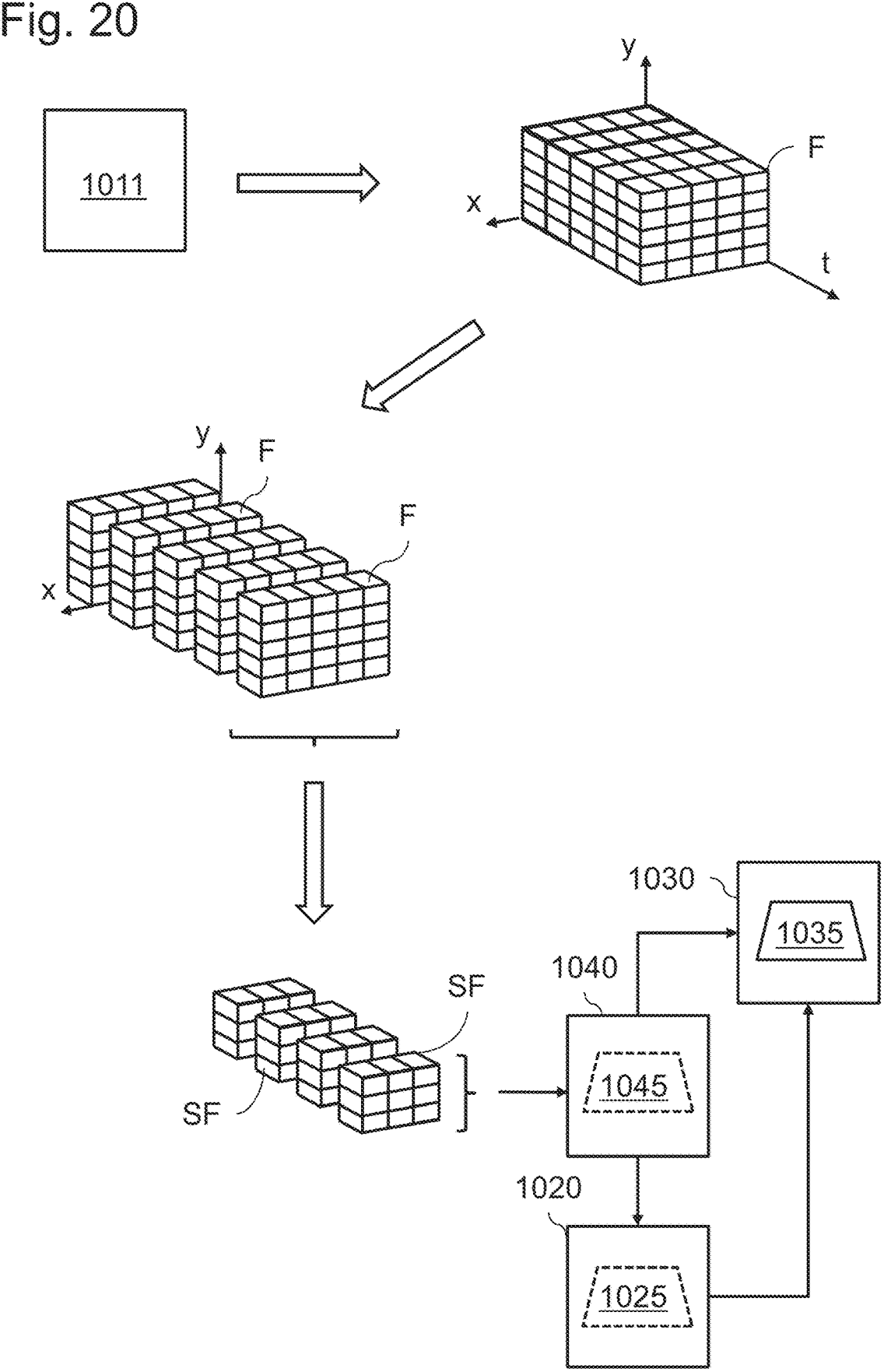
FIG. 20 is a schematic illustration of another processing of event data.

In the above examples, all the information provided during a given time period constituted a portion of the data stream for which one trigger signal is generated. An alternative setup is described with respect to FIG. 20. Also in this example, first event frames F are generated from the event stream as explained above with respect to FIG. 18.

From these event frames sub-frames SF are generated by the vision sensor 1010. For the further processing each subframe SF constitutes a portion of the data stream. This means (if present) the encoding unit 1040 encodes separately all subframes SF of one event frame F and the trigger unit 1020 generates one trigger signal for one sub-frame SF. The processing unit 1040 carries out the predetermined processing only based on the subframes SF for which the predetermined processing was indicated to be allowed by the respective trigger signal.

Thus, according to this implementation, also sub-features of a scene can be disregarded in the processing. This makes the processing more flexible. Moreover, it might be sufficient for the processing unit 1030 to discard processing of all subframes SF of one event frame F, if a single subframe SF is not allowed for processing by the trigger unit 1020. This can further filter out event frames F that should not be processed based on subframe features, which helps to make the processing more efficient. Here, in the case that all subframes SF are allowed, processing can be performed on the original event frame F, if this is advantageous. Of course, it is also possible to generate event blocks as described above for each or some of the subframes SF.

Subframes SF can most easily be generated by simply dividing an event frame spatially, e.g. by a grid. However, subframe generation may also be more refined and use e.g. algorithms like de-shuffling and shuffling as described with respect to FIG. 21.

In a de-shuffling algorithm an array of a given size is split into several arrays by extracting and combining array entries that have a certain spatial distance. Shuffling is the reciprocal operation, i.e. it takes several small arrays and interleaves them such that all adjacent entries of the small arrays are separated by a predetermined distance in a larger array.

This is shown in FIG. 21 based on one 4×4 array (i.e. 1×4×4=16 entries) that constitutes an event frame F. This array is de-shuffled by combining all entries separated by one in-between entry (i.e. having a distance of 2 entries). In FIG. 21 the array cells to be combined are shown with the same hatching. In this manner, four 2×2 arrays (i.e. 4×2× 2=16 entries) are generated that constitute subframes SF.

What can also be seen in this example is that if the same information is spatially distributed several times in the larger array, i.e. the event subframe, this can be recognized by the de-shuffling algorithm. In fact, it is apparent that all four small arrays contain the numbers 1-2-3-4. If this distribution of numbers will not lead to a positive trigger signal, i.e. to an allowance of processing, it is sufficient to determine this for one of the subframes SF and discard the entire event frame F.

Thus, by using subframes SF for setting the trigger signals for the entire event frame F it becomes possible to detect event frames F that should not be processed earlier than it would be possible for a processing of the entire event frame F. As stated above, this further enhances the processing efficiency.

All the above-described examples allow such an enhanced processing efficiency. The core reason for this efficiency gain is the introduction of a vision sensor 1010 and/or a trigger unit 1020 that can be trained together with a processing unit 1030 to provide only data that is useful for processing to the processing unit 1030. Moreover, due to the combined training the data can brought in a format that allows most efficient processing.

In this manner, various predetermined tasks can be carried out by the processing unit 1030 in a satisfactory manner with reduced processing burden and reduced energy consumption.

Figure 22:
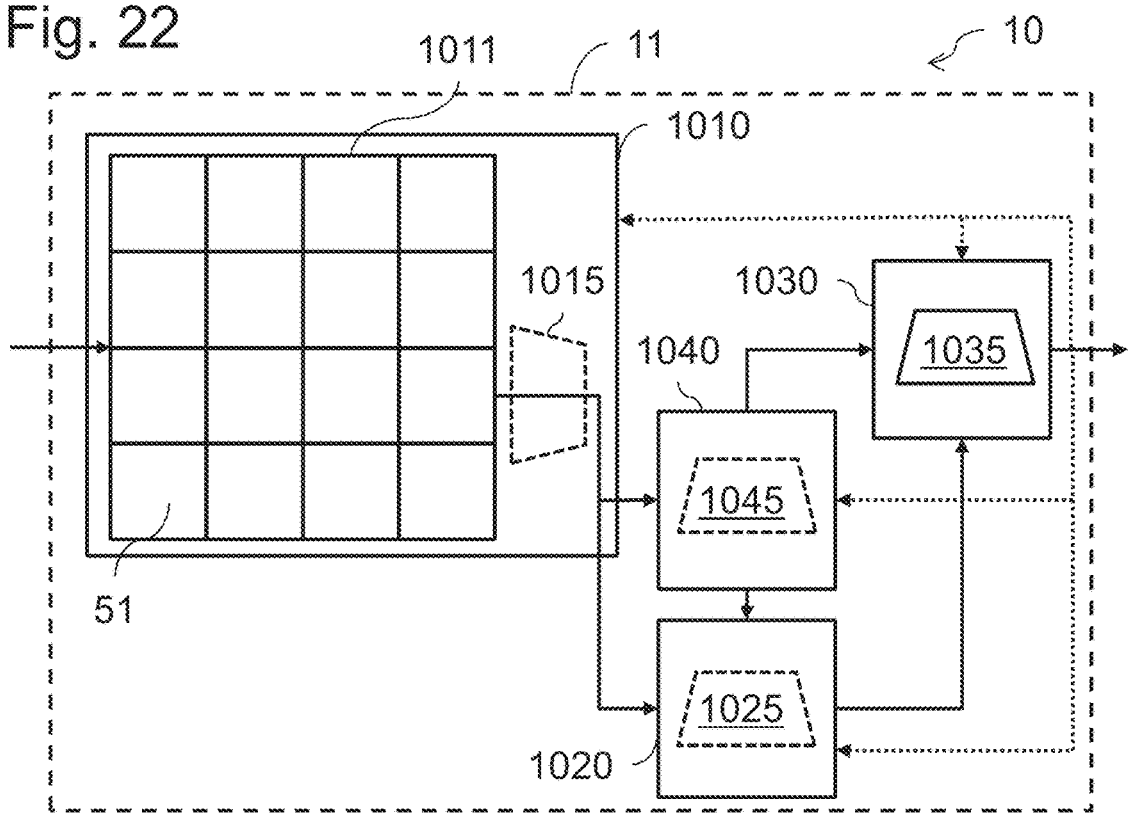
FIG. 22 is a schematic block diagram of another sensor device.

In the above description it was assumed that the generation of the trigger signal is carried out by the trained second machine learning module 1025 of the trigger unit 1020. However, in order to save storage and reduce the necessary computational power, the trigger unit 1020 may also operate without the second machine learning module 1025. Instead, the encoding unit 1040 is used to generate representations of the data stream generated at the vision sensor 1010, where each representation represents a current state of the data stream, and accordingly of the observed environment. This is schematically illustrated in FIG. 22. Below only differences to the sensor devices of FIGS. 14 to 21 will be described. Thus, if not described otherwise the description of FIGS. 14 to 21 also applies for the sensor device of FIG. 22.

As described above the pixels 51 of the vision sensor 1010 receive light and perform photoelectric conversion to generate electrical signals, based on which electrical signals a data stream is formed. Based on this data stream the encoding unit 1040 generates a series of representations. Here, a single representation may be e.g. any series of alphanumerical characters. Preferably, each representation may be constituted by a numerical vector in a state space of the data stream or by a bit sequence representing such a vector. However, in principle also words of a specific language may be used as representations.

In this process the encoding unit 1040 may use the fourth machine learning module 1045 to generate the series of representations. This means that the encoding unit 1040 receives the data stream as an input and provides a temporal series of representations of the respective state of the data stream as an output. However, in principle also a rule-based translation of states of the data stream to a representation might be used, e.g. by providing a look-up table or mapping formula for various possible forms of the data stream. Here, as described above the vision sensor 1010 may also comprise the first machine learning module 1015 to pre-process the data stream such as to allow an optimal and/or easy classification of the states of the data stream into the respective representations.

The trigger unit 1020 is then configured to receive a current representation from the encoding unit 1040, to compare the current representation with a reference representation, and to generate trigger signals based on said comparison. As explained above, the processing unit 1030 will receive these trigger signals and will carry out its predetermined processing by using the first machine learning module 1035 based on representations for which the predetermined processing was indicated to be allowed by the respective trigger signal.

Thus, instead of using the second machine learning module 1025 to analyze and filter the incoming data stream (or an encoded version thereof), the trigger unit 1020 serves as a mere comparator that checks based on a reference representation whether or not the current representation shall be processed by the processing unit 1030. As explained above, the trigger unit 1020 may prevent forwarding of representations for which no according trigger signal was generated, i.e. that do or do not match the reference representation to a sufficient degree. Just as well, all representations may be forwarded to the processing unit 1030, where an according trigger signal allows or prohibits to use the representation as input for the predetermined processing.

In this process, the reference representation may be set by trigger unit 1020 as the last representation for which the predetermined processing was indicated to be allowed by the respective trigger signal. Thus, each newly generated representation will be compared by the trigger unit 1020 with the last representation that was used by the processing unit 1030. In this manner it can be ensured that a trigger signal is only generated, if the compared current representation differs sufficiently from the reference representation. The processing unit 1030 operates then only on representations that indicate a changed state of the data stream, i.e. on a changed state of the observed scene.

Alternatively the reference representation may be fixed and set based on the predetermined processing carried out by the processing unit 1030. This allows to let only those representations pass that are known to be useful for the predetermined processing. For example, if the predetermined processing relates to the detection of specific features in the scene, like specific gestures, objects, edges or the like only representations corresponding to such features might be allowed. For example, if a specific gesture is to be identified, e.g. waving with a hand, only representations of scenes showing any gesture made with a hand may be allowed for processing. In this manner, representations can be filtered out that will not help in solving the task behind the predetermined processing. In this manner processing time and power can be saved without deteriorating the result of the predetermined processing.

When representations are generated by the fourth machine learning module 1045 of the encoding unit 1040, the first machine learning module 1035 and the fourth machine learning module 1045 may be trained together such that the predetermined processing is optimized and such as to provide a reliable distinction of the current representation and the reference representation. This means that finding representations of the states of the data stream is not only constrained by the goal to improve the predetermined processing (e.g. in reliability, processing power or processing speed), but also by the goal to allow a reliable distinction between different states of the data stream. If for example a vector representation is chosen, different states should be assigned to vectors that can be easily distinguished, in order to make an incorrect comparison of states based on insufficiently separated representations unlikely. For example, the machine learning modules may be trained by the additional constraint that states of the data stream represented by the representations can be distinguished with a correctness of more than 80%, preferably of more than 90%, and more preferably of more than 95% or even more. In this manner, speed and processing power of the predetermined processing can be reduced, since the processing unit 1030 obtains reliably only representations that are needed but not those that are unnecessary or redundant, since the trigger unit 1020 filters out all such unnecessary or redundant representations.

In particular, the trigger unit 1020 may calculate a similarity score of the current representation and the reference representation based on a similarity metric. If for example a vector representation is used any vector norm of the difference of two vector representations may be used as similarity metric. In principle, depending on the representation used, any similarity metric can be used that allows a quantitative evaluation of the similarity of representations.

Based on this comparison the trigger unit may allow the predetermined processing of the current representation by the respective trigger signal only when the similarity score satisfies a certain condition. In particular, if forwarding of redundant representations is to be avoided by using the latest previously processed representation as reference representation the similarity score needs to be higher than a predetermined similarity threshold to ensure a sufficient difference between the represented states. If however, a fixed reference representation is used to which the current representation needs to be similar in order to be allowed for processing, the similarity score needs to be smaller than a distinction threshold.

While the similarity metric and the similarity/distinction threshold may in principle be set based on the knowledge of the type of representation, the trigger unit 1020 may also use the second machine learning module 1025 to determine the similarity metric and/or the similarity threshold based on the current representation and the reference representation. Thus, the second machine learning module 1025 may be used to refine the metric/the threshold(s) based on the current and/or the reference representation such as to improve the distinguishability of the two. This makes the filtering of redundant/unnecessary data more reliable.

In this case, at least the first machine learning module 1035, the second machine learning module 1025, and, if used, also the fourth machine learning module 1045, are trained together such that the predetermined processing is optimized and such as to provide a reliable distinction of the current representation and the reference representation. As stated above, distinguishing the respectively represented states of the data stream shall preferably be possible after training with a correctness of more than 80%, preferably of more than 90%, more preferably of more than 95%. Training all involved machine learning modules together ensures that the chosen representation/metric/threshold is optimized according to the constraints set by the need to optimize the reliability of the state distinction via representations as well as the need to optimize the result of the predetermined processing.

Figure 24:
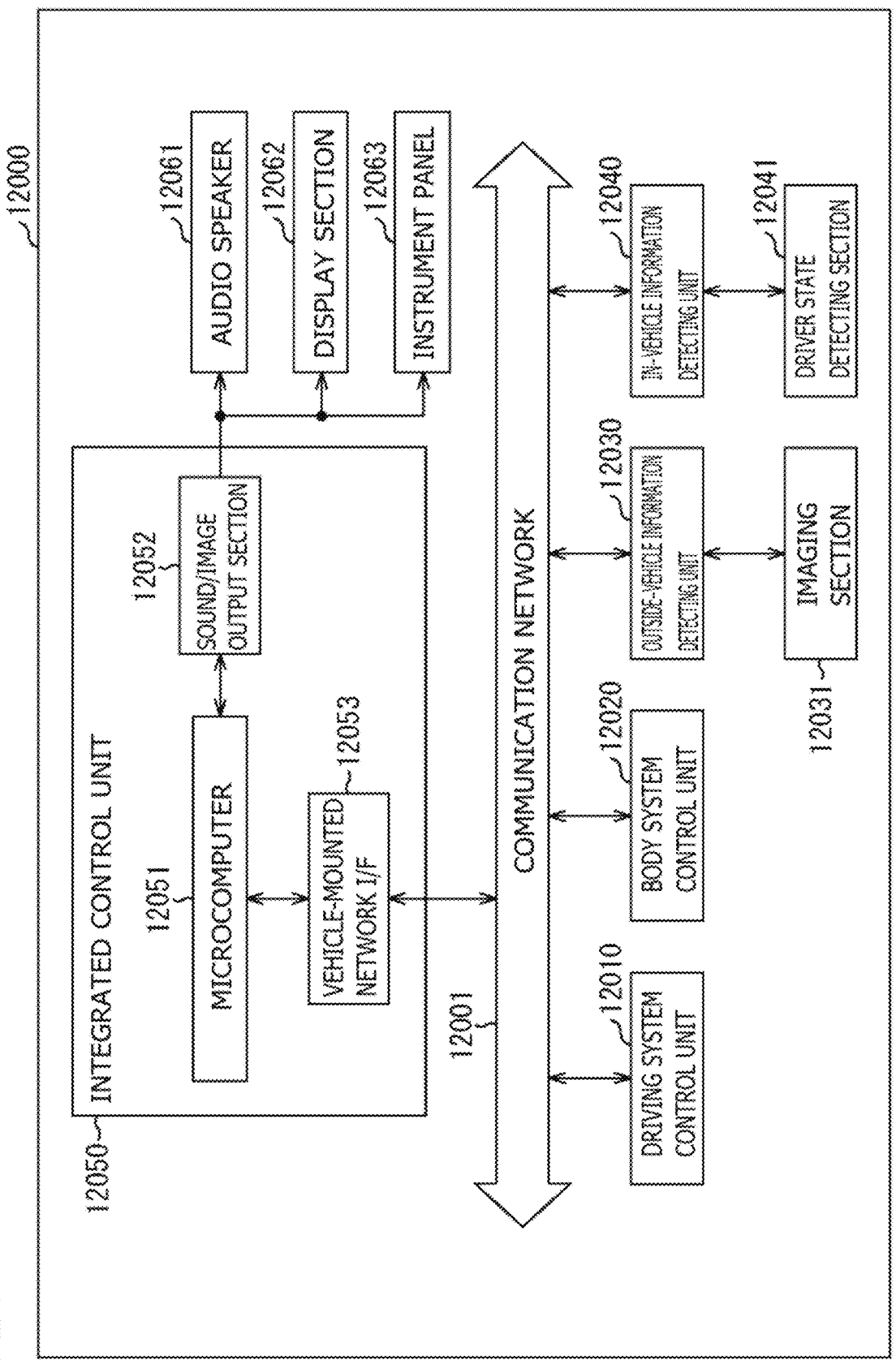
FIG. 24 is a schematic block diagram of a vehicle control system.

Also in the example of FIG. 24 the pixels 51 may be event detection pixels as described above and the vision sensor 1010 may be configured to accumulate the events into event frames having a predetermined temporal length, and to split the event frames spatially into event blocks, wherein each event block constitutes a portion of the data stream formed by the vision sensor 1010 as was described above with respect to FIGS. 18 and 19.

In this context the encoding unit 1040 may be configured to jointly encode all event blocks of one event frame that contains events to generate as a representation a plurality of tokens from the event blocks, which tokens are specific sequences of events. The trigger unit 1020 will then generate one trigger signal for one event frame based on a comparison of at least one of the tokens generated for this event frame with a reference token. This means that whether or not a representation is allowed for processing is determined not based on the entire representation, but based on a comparison on the token level. Reference tokens may here be generated as described above for the representations, i.e. either by updating the reference tokens based on the latest previously processed tokens or by setting fixed reference tokens.

In this process, it might be sufficient that at least one token passes through the comparison to allow processing of the entire representation, or failure of at least one token during comparison might block the entire representation. In any case, processing will become more efficient, if a representation can be rejected or allowed early during a block-wise check of the event frame.

Alternatively or additionally as discussed above with respect to FIG. 20 the vision sensor 1010 may generate sub-frames from each of the event frames, wherein each subframe constitutes a portion of the data stream formed by the vision sensor 1010. In this variant, the encoding unit 1040 is configured to separately generate representations for all subframes of one event frame and the trigger unit 1020 is configured to generate one trigger signal for one subframe. The processing unit 1030 carries out the predetermined processing only based on the subframes for which the predetermined processing was indicated to be allowed by the respective trigger signal. Accordingly, the representation of each subframe is compared to the reference representation and the subframe representations are forwarded independently of each other. This allows a refinement of the data transfer, since also data of event frames that are of interest only at the subframe level can be provided to the processing unit 1030. In this manner important information can be reliably transferred while the overall data amount to be transferred and processed can be reduced.

As indicated by the broken arrows in FIG. 22 the processing unit 1030 may provide a feedback signal to the encoding unit 1040, which feedback signal provides feedback on the outcome of the predetermined processing. The encoding unit 1040 may then generate the current representation also based on the current feedback signal from the processing unit 1030. That is, the outcome of the predetermined processing will be part of the state to be classified. This allows to dynamically adjust the processing to the output generated by the processing unit 1030, which will help to optimize this output.

Figure 23:
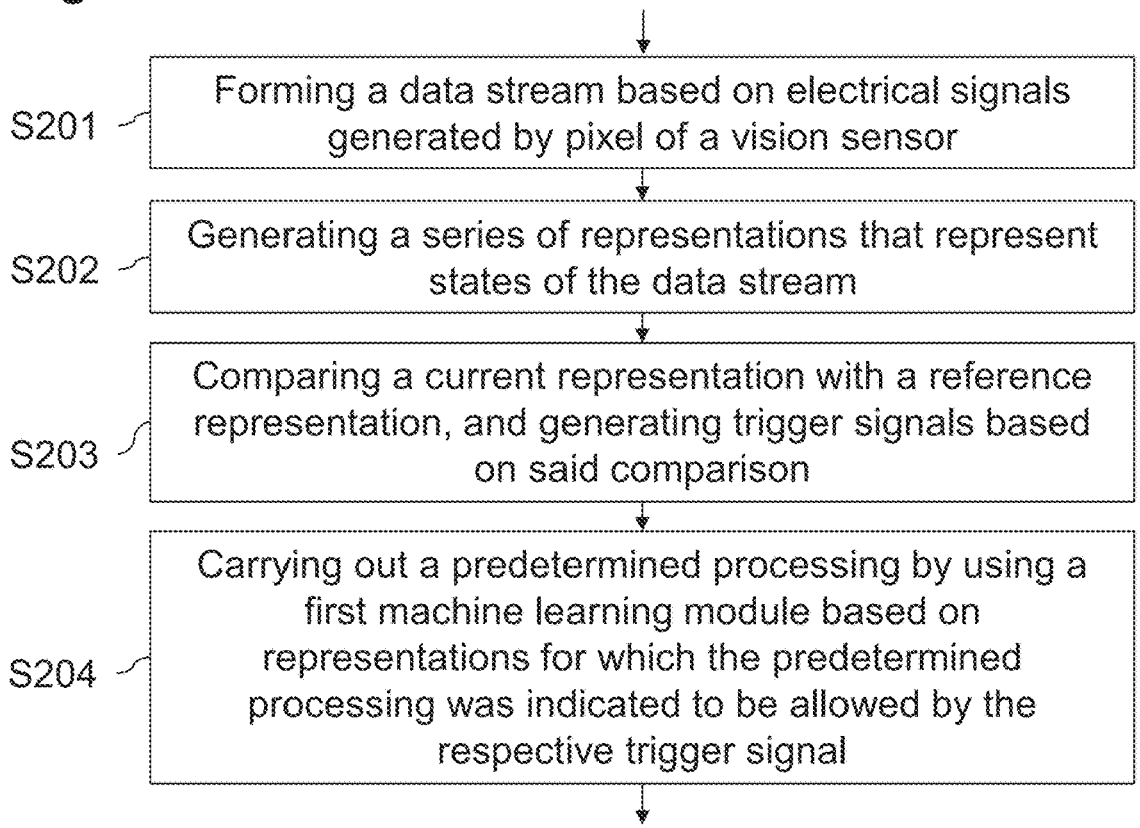
FIG. 23 is a schematic illustration of a process flow of another method for operating a sensor device.

The above may be summarized by the following method for operating a sensor device, which is schematically illustrated by the process flow of FIG. 23. The method comprises at S201, by a vision sensor 1010 that comprises a pixel array 1011 having a plurality of pixels 51 that are each being configured to receive light and to perform photoelectric conversion to generate an electrical signal, forming a data stream based on the generated electrical signals.

At S202, by an encoding unit 1040, the data stream is received and a series of representations is generated that represent states of the data stream. At S203, by a trigger unit 1020, a current representation is received from the encoding unit 1040, the current representation is compared with a reference representation, and trigger signals are generated based on said comparison.

At S203, by a processing unit 1030, the trigger signals are received and a predetermined processing is carried out by using a first machine learning module 1035 based on representations for which the predetermined processing was indicated to be allowed by the respective trigger signal.

This method may be supplemented by generating the series of representations based on a fourth machine learning module 1045 and training the first machine learning module 1035 together with the fourth machine learning module 1045 such that the predetermined processing is optimized and such as to provide a reliable distinction of the current representation and the reference representation, preferably by distinguishing the respectively represented states of the data stream with a correctness of more than 80%, preferably of more than 90%, more preferably of more than 95%.

Here, as described above training comprises defining a loss function for each of the machine learning modules that are trained together, and jointly optimizing the loss functions of the machine learning modules that are trained together.

In this manner it is possible to filter out unnecessary or redundant parts of the data stream generated by the vision sensor without the need to run a machine learning module on the data. Instead, a representation is found that allows reliably distinguishing between different states of the data stream (i.e. of the observed scene). This representation is then used to generate trigger signals in a relatively easy manner by a mere comparison to a reference representation.

The technology according to the above (i.e. the present technology) is applicable to various products. For example, the technology according to the present disclosure may be realized as a device that is installed on any kind of moving bodies, for example, vehicles, electric vehicles, hybrid electric vehicles, motorcycles, bicycles, personal mobilities, airplanes, drones, ships, and robots.

FIG. 24 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 24, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automatic driving, which makes the vehicle to travel autonomously without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 24, an audio speaker 12061, a display section 12062, and an instrument panel 12063 are illustrated as the output device. The display section 12062 may, for example, include at least one of an on-board display and a head-up display.

Figure 25:
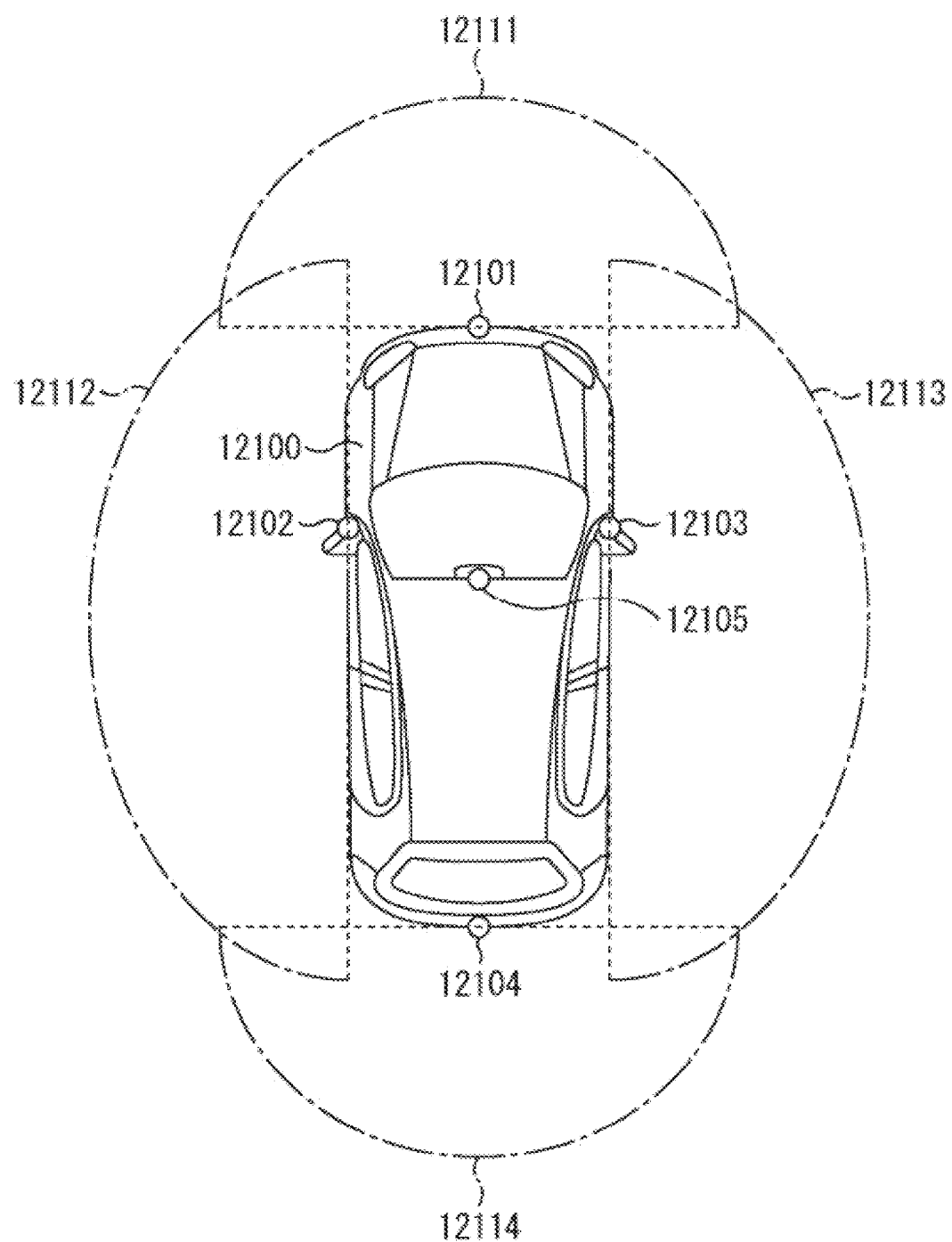
FIG. 25 is a diagram of assistance in explaining an example of installation positions of an outside-vehicle information detecting section and an imaging section.

FIG. 25 is a diagram depicting an example of the installation position of the imaging section 12031.

In FIG. 25, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 25 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automatic driving that makes the vehicle travel autonomously without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

An example of the vehicle control system to which the technology according to the present disclosure is applicable has been described above. The technology according to the present disclosure is applicable to the imaging section 12031 among the above-mentioned configurations. Specifically, the sensor device 10 is applicable to the imaging section 12031. The imaging section 12031 to which the technology according to the present disclosure has been applied flexibly acquires event data and performs data processing on the event data, thereby being capable of providing appropriate driving assistance.

Figure 26A:
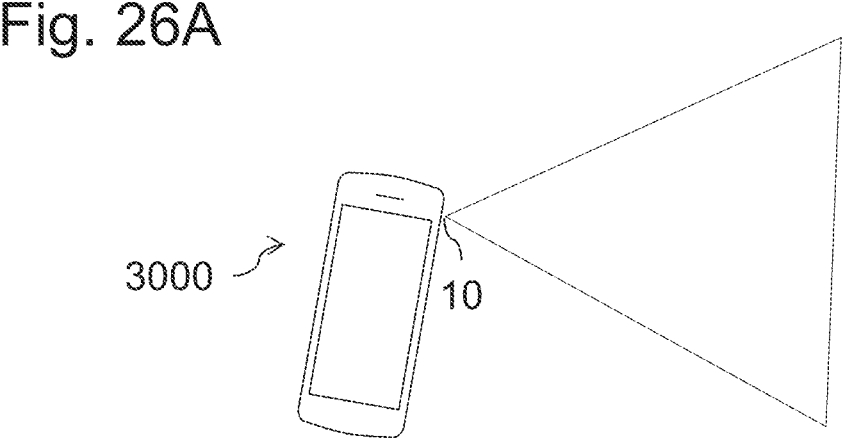
FIGS. 26A and 26B are schematic illustrations of a mobile device and a head mounted display comprising a sensor device.
Figure 26B:
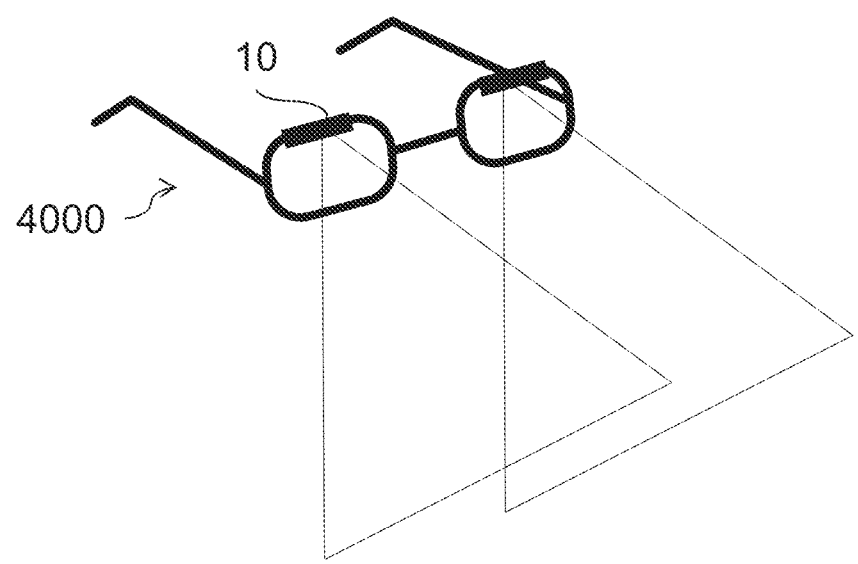

Further possible implementations of the sensor device 10 are mobile devices 3000 such as cell phones, tablets, smart watches and the like as shown in FIG. 26A or head-mounted displays 4000 as shown in FIG. 26B. Further, the sensor device 10 is useable in augmented and/or virtual reality applications/cameras or in surveillance systems like 3600 cameras.

Note that, the embodiments of the present technology are not limited to the above-mentioned embodiment, and various modifications can be made without departing from the gist of the present technology.

Further, the effects described herein are only exemplary and not limited, and other effects may be provided.

Note that, the present technology can also take the following configurations.

[1] A sensor device (10) comprising:
  a vision sensor (1010) that comprises a pixel array (1011) having a plurality of pixels (51) each being configured to receive light and to perform photoelectric conversion to generate an electrical signal, based on which electrical signals a data stream is formed;
  an encoding unit (1040) that receives the data stream and generates a series of representations that represent states of the data stream;
  a trigger unit (1025) that is configured to receive a current representation from the encoding unit (1040), to compare the current representation with a reference representation, and to generate trigger signal based on said comparison; and
  a processing unit (1030) that is configured to receive the trigger signals and to carry out predetermined processing based on representations for which the predetermined processing was indicated to be allowed by the respective trigger signal; wherein
  the processing unit (1030) is configured to use a first machine learning module (1035) to carry out the predetermined processing.

[2] The sensor device (10) according [1], wherein
  the encoding unit (1040) is configured to generate the series of representations based on a fourth machine learning module (1045); and
  the first machine learning module (1035) has been trained together with the fourth machine learning module (1045) such that the predetermined processing is optimized and such as to provide a reliable distinction of the current representation and the reference representation, preferably by distinguishing the respectively represented states of the data stream with a correctness of more than 80%, preferably of more than 90%, more preferably of more than 95%.

[3] The sensor device (10) according to [1] or [2], wherein
  the trigger unit (1020) is configured to set the last representation for which the predetermined processing was indicated to be allowed by the respective trigger signal to be the new reference representation.

[4] The sensor device (10) according to [1] or [2], wherein
  the reference representation is fixed and set based on the predetermined processing carried out by the processing unit (1030).

[5] The sensor device (10) according to any one of [1] to [4], wherein
  the trigger unit (1020) is configured to calculate a similarity score of the current representation and the reference representation based on a similarity metric, and to allow the predetermined processing of the current representation by the respective trigger signal when the similarity score is higher than a predetermined similarity threshold.

[6] The sensor device (10) according to any one of [1] to [5], wherein
  the trigger unit (1020) comprises a second machine learning module (1025) that is configured to determine the similarity metric and/or the similarity threshold based on the current representation and the reference representation; and at least the first machine learning module (1035), the second machine learning module (1025), and preferably also the fourth machine learning module (1045), are trained together such that the predetermined processing is optimized and such as to provide a reliable distinction of the current representation and the reference representation, preferably by distinguishing the respectively represented states of the data stream with a correctness of more than 80%, preferably of more than 90%, more preferably of more than 95%.

[7] The sensor device (10) according to any one of [1] to [6], comprising
a single sensor chip (11) on which the vision sensor and the trigger unit are formed.

[8] The sensor device (10) according to any one of [1] to [7], wherein
the trigger unit (1020) is configured to prohibit transfer of the current representation to the processing unit (1030), if the respective trigger signal indicates that the predetermined processing is not allowed for the current representation.

[9] The sensor device (10) according to any one of [1] to [8], wherein
the pixels (51) are event detection pixels that are each configured to generate event data based on the received light, which event data indicate as an event the occurrence of an intensity change of the light above an event detection threshold.

[10] The sensor device (10) according to [9], wherein
the vision sensor (1010) is configured to accumulate the events into event frames having a predetermined temporal length, and to split the event frames spatially into event blocks, wherein each event block constitutes a portion of the data stream formed by the vision sensor (1010);
the encoding unit (1040) is configured to jointly encode all event blocks of one event frame that contains events to generate as a representation a plurality of tokens from the event blocks, which tokens are specific sequences of events; and
the trigger unit (1020) is configured to generate one trigger signal for one event frame based on a comparison of at least one of the tokens generated for this event frame with a reference token.

[11] The sensor device (10) according to [9], wherein
the vision sensor (1010) is configured to accumulate the events into event frames having a predetermined temporal length, and to generate sub-frames from each of the event frames, wherein each subframe constitutes a portion of the data stream formed by the vision sensor (1010);
the encoding unit (1040) is configured to separately generate representation for all subframes of one event frame;
the trigger unit (1020) is configured to generate one trigger signal for one sub-frame; and
the processing unit (1030) is configured to carry out the predetermined processing only based on the subframes for which the predetermined processing was indicated to be allowed by the respective trigger signal.

[12] The sensor device (10) according to any one of [1] to [11], wherein
the processing unit (1030) is configured to provide a feedback signal to the encoding unit (1040), which feedback signal provides feedback on the outcome of the predetermined processing;
the encoding unit (1040) is configured to generate the current representation also based on the current feedback signal from the processing unit (1030).

[13] A method for operating a sensor device (10), the method comprising
by a vision sensor (1010) that comprises a pixel array (1011) having a plurality of pixels (51) each being configured to receive light and to perform photoelectric conversion to generate an electrical signal, forming a data stream based on the generated electrical signals;
by an encoding unit (1040), receiving the data stream and generating a series of representations that represent states of the data stream;
by a trigger unit (1020), receiving a current representation from the encoding unit (1040), comparing the current representation with a reference representation, and generating trigger signals based on said comparison;
by a processing unit (1030), receiving the trigger signals and carrying out a predetermined processing by using a first machine learning module (1035) based on representations for which the predetermined processing was indicated to be allowed by the respective trigger signal.

[14] The method according to [13], wherein
the series of representations is generated based on a fourth machine learning module (1045); and
the method comprises further:
training the first machine learning module (1035) together with the fourth machine learning module (1045) such that the predetermined processing is optimized and such as to provide a reliable distinction of the current representation and the reference representation, preferably by distinguishing the respectively represented states of the data stream with a correctness of more than 80%, preferably of more than 90%, more preferably of more than 95%.

[15] The method according to [14], wherein
training comprises defining a loss function for each of the machine learning modules that are trained together, and
jointly optimizing the loss functions of the machine learning modules that are trained together.

[16] A sensor device (10) comprising:
a vision sensor (1010) that comprises a pixel array (1011) having a plurality of pixels (51) each being configured to receive light and to perform photoelectric conversion to generate an electrical signal, based on which electrical signals a data stream is formed and output by the vision sensor (1010);
a trigger unit (1020) that is configured to receive portions of the data stream and to generate trigger signals based on said portions of the data stream and optionally to use a feedback signal from a processing unit (1030); and
the processing unit (1030) that is configured to receive the trigger signals and to carry out a predetermined processing of a portion of the data stream for which the predetermined processing was indicated to be allowed by the respective trigger signal; wherein
the processing unit (1030) is configured to use a first machine learning module (1035) to carry out the predetermined processing which first machine learning module (1035) has been trained such as to optimize the predetermined processing together with a second machine learning module (1025) used by the trigger unit (1020) to generate the trigger signals and/or a third machine learning module (1015) used by the vision sensor (1010) to generate the data stream.

[17] The sensor device (10) according to [16], comprising a single sensor chip (11) on which the vision sensor (1010) and the trigger unit (1020) are formed.

[18] The sensor device (10) according to any one of [16] to [17], wherein
the pixels (51) are event detection pixels that are each configured to generate event data based on the received light, which event data indicate as an event the occurrence of an intensity change of the light above an event detection threshold.

[19] The sensor device (10) according to any one of [16] to [17], wherein
the trigger unit (1020) is configured to prohibit transfer of a portion of the data stream to the processing unit (1030), if the respective trigger signal indicates that the predetermined processing is not allowed for said portion of the data stream.

[20] The sensor device (10) according to any one of [16] to [19], further comprising
an encoding unit (1040) that is configured to encode portions of the data stream based on a fourth machine learning module (1045); wherein
the trigger unit (1020) is configured to generate the trigger signals based on the encoded portions of the data stream based on the second machine learning module (1025) and optionally to use a feedback signal from the processing unit (1030); and
at least the first machine learning module (1035), the second machine learning module (1025), and the fourth machine learning module (1045) have been trained together to optimize the predetermined processing carried out by the processing unit (1030).

[21] The sensor device (10) according to [20], wherein
the second machine learning module (1025) and/or the fourth machine learning module (1045) are recurrent neural networks, RNNs, or long short-term memory, LSTM, networks.

[22] The sensor device (10) according to any one of [20] to [21], wherein
the pixels (51) are event detection pixels that are each configured to generate event data based on the received light, which event data indicate as an event the occurrence of an intensity change of the light above an event detection threshold;
the vision sensor (1010) is configured to accumulate the events into event frames (F) having a predetermined temporal length, and to split the event frames (F) spatially into event blocks (B), wherein each event block (B) constitutes a portion of the data stream formed and output by the vision sensor (1010);
the encoding unit (1040) is configured to jointly encode all event blocks (B) of one event frame (F) that contain events to generate a plurality of tokens from the event blocks (B), which tokens are specific sequences of events; and
the trigger unit (1020) is configured to generate one trigger signal for one event frame (F) based on at least one of the tokens generated for this event frame (F).

[23] The sensor device (10) according to any one of [20] to [21], wherein
the pixels (51) are event detection pixels that are each configured to generate event data based on the received light, which event data indicate as an event the occurrence of an intensity change of the light above an event detection threshold;
the vision sensor (1010) is configured to accumulate the events into event frames (F) having a predetermined temporal length, and to generate sub-frames (SF) from each of the event frames (F), wherein each subframe (SF) constitutes a portion of the data stream formed and output by the vision sensor (1010);
the encoding unit (1040) is configured to separately encode all subframes (SF) of one event frame (F);
the trigger unit (1020) is configured to generate one trigger signal for one sub-frame (SF); and
the processing unit (1040) is configured to carry out the predetermined processing only based on the sub-frames (SF) for which the predetermined processing was indicated to be allowed by the respective trigger signal.

[24] The sensor device (10) according to any one of [16] to [23], wherein
the first machine learning module (1035), the second machine learning module (1025), and the third machine learning module (1015) (and preferably the fourth machine learning module (1045)) are neural networks with fixed weights that have been fixed in the common training.

[25] The sensor device (10) according to any one of [16] to [23], wherein
the first machine learning module (1035), the second machine learning module (1025), and the third machine learning module (1015) (and preferably the fourth machine learning module (1045)) are neural networks whose weights are continuously adapted by a continual learning algorithm that optimizes the predetermined processing.

[26] The sensor device (10) according to any one of [16] to [25], wherein
the processing unit (1030) is configured to provide a feedback signal to the vision sensor (1010) and the trigger unit (1020), which feedback signal provides feedback on the outcome of the predetermined processing;
the vision sensor (1010) is configured to update a latent representation of the environment observed by the vision sensor (1010) and to provide the current latent representation to the trigger unit (1020); and
the trigger unit (1020) is configured to generate the trigger signals also based on the current feedback signal obtained from the processing unit (1030) and the current latent representation obtained from the vision sensor (1010).

[27] A method for operating a sensor device (10), the method comprising
by a vision sensor (1010) that comprises a pixel array (1011) having a plurality of pixels (51) each being configured to receive light and to perform photoelectric conversion to generate an electrical signal, forming and outputting a data stream based on the generated electrical signals;
by a trigger unit (1020), receiving portions of the data stream and generating trigger signals based on said portions of the data stream;

by a processing unit (1040), receiving the trigger signals and carrying out a predetermined processing of a portion of the data stream for which the predetermined processing was indicated to be allowed by the respective trigger signal by using a first machine learning module (1035); and training the first machine learning module (1035) such as to optimize the predetermined processing together with a second machine learning module (1025) used for generating the trigger signals and/or a third machine learning module (1015) used for generating the data stream.

[28] The method according to [27], wherein
training comprises defining a loss function for each of the machine learning modules that are trained together, and jointly optimizing the loss functions of the machine learning modules that are trained together.

[29] The method according to [28], wherein
if training is performed by applying supervised learning, the loss function for the first machine learning module (1035) is cross entropy loss and the loss function for the second machine learning module (1025) is cross entropy loss or connectionist temporal classification, CTC, loss; and
if training is performed by applying unsupervised learning the loss function of the first machine learning module (1035) is mean square error loss or contrastive loss and the loss function of the second machine learning module (1025) is cross entropy loss.

[30] The method according to any one of [27] to [29], wherein
training is carried out by applying a backpropagation algorithm with, preferably stochastic, gradient descent.

[31] The method according to any one of [27] to [29], wherein
training is carried out by applying a continual learning algorithm.

The invention claimed is:

1. A sensor device comprising:
a vision sensor that comprises a pixel array having a plurality of pixels each being configured to receive light and to perform photoelectric conversion to generate an electrical signal, based on which electrical signals a data stream is formed;
encoding circuitry that receives the data stream and generates a series of representations that represent states of the data stream;
trigger circuitry that is configured to receive a current representation from the encoding circuitry, to compare the current representation with a reference representation, and to generate trigger signal based on said comparison; and
processing circuitry configured to
receive the trigger signals and to carry out predetermined processing based on representations for which the predetermined processing was indicated to be allowed by the respective trigger signal, and
use a first machine learning module to carry out the predetermined processing.

2. The sensor device according to claim 1, wherein
the encoding circuitry is configured to generate the series of representations based on a fourth machine learning module; and the first machine learning module has been trained together with the fourth machine learning module such that the predetermined processing is optimized and such as to provide a reliable distinction of the current representation and the reference representation, by distinguishing the respectively represented states of the data stream with a correctness of more than 80%, more than 90%, more or more than 95%.

3. The sensor device according to claim 1, wherein
the trigger circuitry is configured to set the last representation for which the predetermined processing was indicated to be allowed by the respective trigger signal to be the new reference representation.

4. The sensor device according to claim 1, wherein
the reference representation is fixed and set based on the predetermined processing carried out by the processing circuitry.

5. The sensor device according to claim 1, wherein
the trigger circuitry is configured to calculate a similarity score of the current representation and the reference representation based on a similarity metric, and to allow the predetermined processing of the current representation by the respective trigger signal when the similarity score is higher than a predetermined similarity threshold.

6. The sensor device according to claim 1, wherein
the trigger circuitry comprises a second machine learning module that is configured to determine a similarity metric and/or a similarity threshold based on the current representation and the reference representation; and
at least the first machine learning module, the second machine learning module are trained together such that the predetermined processing is optimized and such as to provide a reliable distinction of the current representation and the reference representation by distinguishing the respectively represented states of the data stream with a correctness of more than a predetermined percentage.

7. The sensor device according to claim 1, comprising
a single sensor chip on which the vision sensor and the trigger circuitry are formed.

8. The sensor device according to claim 1, wherein
the trigger circuitry is configured to prohibit transfer of the current representation to the processing circuitry, if the respective trigger signal indicates that the predetermined processing is not allowed for the current representation.

9. The sensor device according to claim 1, wherein
the pixels are event detection pixels that are each configured to generate event data based on the received light, wherein the event data indicate, as an event, the occurrence of an intensity change of the light above an event detection threshold.

10. The sensor device according to claim 9, wherein
the vision sensor is configured to accumulate the events into event frames having a predetermined temporal length, and to split the event frames spatially into event blocks, wherein each event block constitutes a portion of the data stream formed by the vision sensor;
the encoding circuitry is configured to jointly encode all event blocks of one event frame that contain events to generate, as a representation, a plurality of tokens from the event blocks, wherein the tokens are specific sequences of events; and the trigger circuitry is configured to generate one trigger signal for one event frame based on a comparison of at least one of the tokens generated for this event frame with a reference token.

11. The sensor device according to claim 9, wherein
the vision sensor is configured to accumulate the events into event frames having a predetermined temporal length, and to generate sub-frames from each of the event frames, wherein each subframe constitutes a portion of the data stream formed by the vision sensor;
the encoding circuitry is configured to separately generate representation for all subframes of one event frame;
the trigger circuitry is configured to generate one trigger signal for one sub-frame; and
the processing circuitry is configured to carry out the predetermined processing only based on the subframes for which the predetermined processing was indicated to be allowed by the respective trigger signal.

12. The sensor device according to claim 1, wherein
the processing circuitry is configured to provide a feedback signal to the encoding circuitry, which feedback signal provides feedback on the outcome of the predetermined processing;
the encoding circuitry is configured to generate the current representation also based on the current feedback signal from the processing circuitry.

13. A method for operating a sensor device, the method comprising:
by a vision sensor that comprises a pixel array having a plurality of pixels each being configured to receive light and to perform photoelectric conversion to generate an electrical signal, forming a data stream based on the generated electrical signals;
by encoding circuitry, receiving the data stream and generating a series of representations that represent states of the data stream;
by trigger circuitry, receiving a current representation from the encoding circuitry, comparing the current representation with a reference representation, and generating trigger signals based on said comparison;
by a processing circuitry, receiving the trigger signals and carrying out a predetermined processing by using a first machine learning module based on representations for which the predetermined processing was indicated to be allowed by the respective trigger signal.

14. The method according to claim 13, wherein
the series of representations is generated based on a fourth machine learning module; and
the method comprises further:
training the first machine learning module together with the fourth machine learning module such that the predetermined processing is optimized and such as to provide a reliable distinction of the current representation and the reference representation, by distinguishing the respectively represented states of the data stream with a correctness of more than a predetermined percentage.

15. The method according to claim 14, wherein
training comprises defining a loss function for each of the machine learning modules that are trained together, and jointly optimizing the loss functions of the machine learning modules that are trained together.

16. The sensor device according to claim 6, wherein the predetermined percentage is 80%, 90%, or 95%.

17. The method according to claim 14, wherein the predetermined percentage is 80%, 90%, or 95%.

* * * * *